(12) United States Patent
Zhu et al.

(10) Patent No.: US 11,188,492 B2
(45) Date of Patent: Nov. 30, 2021

(54) ENHANCED SERIAL PERIPHERAL INTERFACE (ESPI) PORT EXPANDER

(71) Applicant: Intel Corporation, Santa Clara, CA (US)

(72) Inventors: Zhenyu Zhu, Folsom, CA (US); Joel L. Finkel, Chandler, AZ (US); Lean Kim Ong, Penang (MY); Siow Hoay Lim, Penang (MY); Mikal Hunsaker, El Dorado Hills, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/234,081

(22) Filed: Dec. 27, 2018

(65) Prior Publication Data

US 2019/0129880 A1    May 2, 2019

(51) Int. Cl.
G06F 13/42    (2006.01)
G06F 13/40    (2006.01)

(52) U.S. Cl.
CPC ...... *G06F 13/4045* (2013.01); *G06F 13/4282* (2013.01)

(58) Field of Classification Search
None
See application file for complete search history.

(56) References Cited

U.S. PATENT DOCUMENTS

| | | | |
|---|---|---|---|
| 7,835,405 B2* | 11/2010 | Kaluskar | H04L 47/10 370/512 |
| 8,000,241 B2* | 8/2011 | O'Neill | H04L 12/185 370/235 |
| 8,793,351 B2* | 7/2014 | Renzin | H04L 41/08 709/220 |
| 9,384,367 B2* | 7/2016 | Swanson | G06F 21/72 |
| 9,544,069 B2* | 1/2017 | Whitby-Strevens | H04B 17/0085 |
| 9,998,570 B2* | 6/2018 | Aladdin | H04L 67/36 |
| 2008/0232375 A1* | 9/2008 | Hachiya | H04L 43/00 370/392 |
| 2012/0321315 A1* | 12/2012 | Timm | H04Q 11/0067 398/67 |
| 2013/0111038 A1* | 5/2013 | Girard | H04L 47/803 709/226 |
| 2016/0094402 A1* | 3/2016 | Finkelstein | H04L 41/0803 709/226 |
| 2017/0185559 A1* | 6/2017 | Hunsaker | G06F 13/4282 |

* cited by examiner

*Primary Examiner* — Elias Mamo
(74) *Attorney, Agent, or Firm* — Nicholson De Vos Webster & Elliott LLP

(57) ABSTRACT

Apparatuses and methods relating to an enhanced serial peripheral interface (eSPI) port expander circuitry are described. In an embodiment, an apparatus includes an upstream eSPI port, a plurality of downstream eSPI ports, and an eSPI aggregator. The upstream eSPI port is to operate as an eSPI slave on an upstream eSPI bus. Each of the plurality of downstream eSPI ports is to operate as an eSPI master on a corresponding one of a plurality of downstream eSPI buses. The eSPI aggregator is to forward or broadcast transactions from the upstream eSPI bus to one or more of the plurality of downstream eSPI buses and to aggregate responses from one or more of the downstream eSPI buses.

17 Claims, 9 Drawing Sheets

ENHANCED SERIAL PERIPHERAL INTERFACE (ESPI) PORT EXPANDER

TECHNICAL FIELD

The disclosure relates generally to electronics, and, more specifically, an embodiment of the disclosure relates to communication using an enhanced serial peripheral interface (eSPI).

BACKGROUND

Electronics (e.g., computer systems) generally employ one or more electrical connections to facilitate the transmittal of data (e.g., communication) between devices, such as between a computing system and a (e.g., external) peripheral.

BRIEF DESCRIPTION OF THE DRAWINGS

The present disclosure is illustrated by way of example and not limitation in the figures of the accompanying drawings, in which like references indicate similar elements and in which.

DETAILED DESCRIPTION

Figure 1:
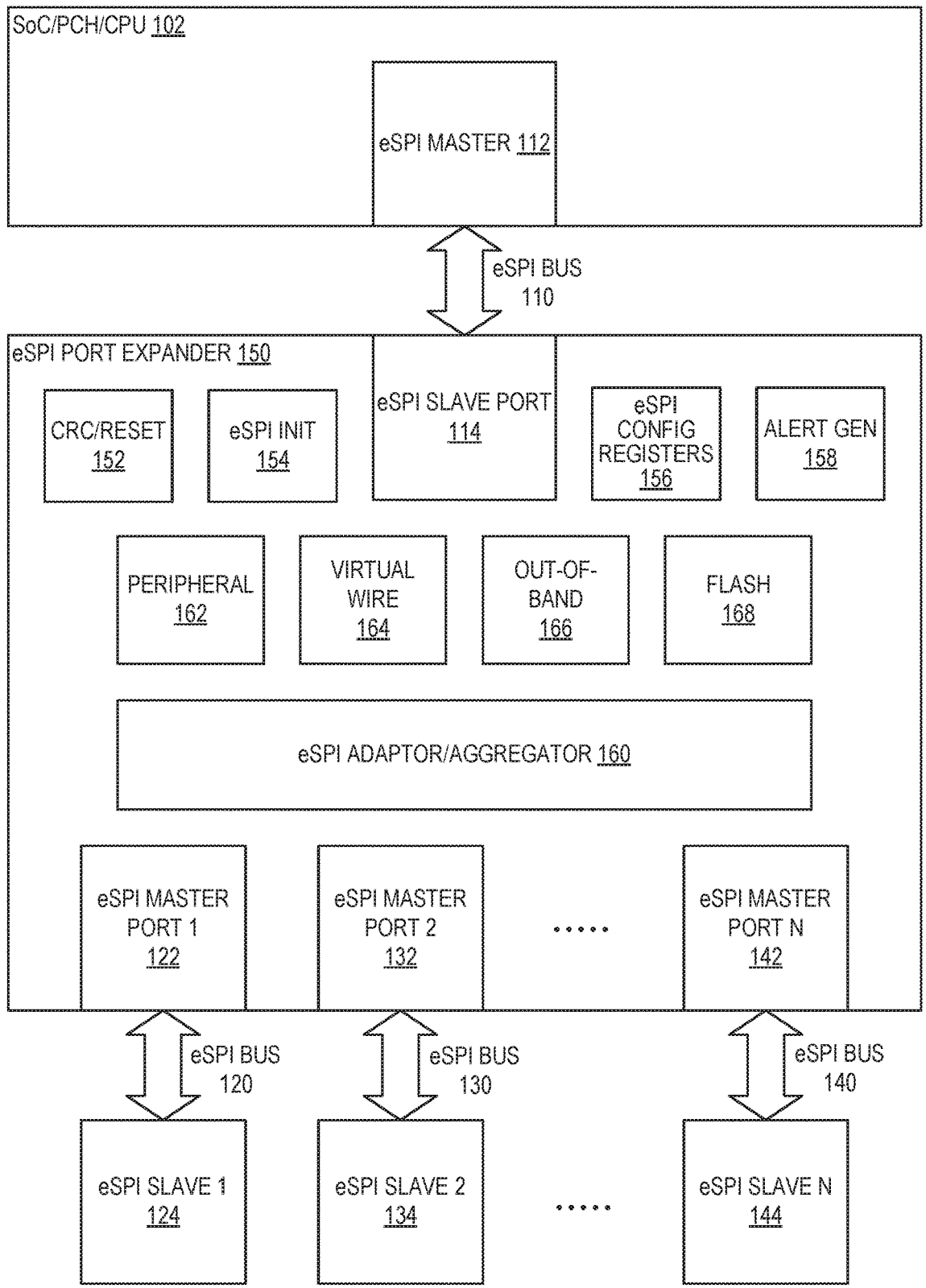
FIG. 1 is a block diagram of a system including an enhanced serial peripheral interface (eSPI) port expander according to an embodiment of the invention.

In the following description, numerous specific details are set forth. However, it is understood that embodiments of the disclosure may be practiced without these specific details. In other instances, well-known circuits, structures, and techniques have not been shown in detail in order not to obscure the understanding of this description.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments, whether or not explicitly described.

Electronics (e.g., computing systems) generally employ one or more electrical couplings (e.g., wired or wireless connections) to facilitate the transmission and reception of data (e.g., communication) between devices, such as, but not limited to, between a computing system (e.g., a computer including a hardware processor) and a (e.g., external) peripheral. Non-limiting examples of peripherals are a keyboard, mouse, external storage device (e.g., hard disk drive), and mobile device (e.g., smartphone or tablet). Electronics (e.g., computing systems) also generally employ one or more electrical couplings (e.g., wired connections) to facilitate the transmission and reception of data (e.g., communication) within a device (e.g., inter-chip communications).

Certain electrical couplings (e.g., connections) include parallel conductors (e.g., parallel wires or other electrically conductive paths). One embodiment of an electrical connection is a bus. One embodiment of a bus is a multiple conductor bus, for example, where the conductors (e.g., wires) allow parallel (e.g., concurrent) transmittal of data thereon. The term electrical coupling may generally refer to one or more connections, communication lines and/or interfaces, shared connections, and/or point-to-point connections, which may be connected by appropriate bridges, hubs, adapters, and/or controllers. A serial bus (e.g., serial bus architecture) may generally refer to a (e.g., shared) communication channel that transmits data one bit after another (e.g., sequentially), for example, over a (e.g., each) channel (e.g., single wire or fiber).

In this specification, the phrase enhanced serial peripheral interface (eSPI) generally refers to a specification(s) for a synchronous serial communication interface having unique chip select pins for each port supported endpoint peripheral device. In one embodiment, an eSPI specification is the eSPI Interface Base Specification (for Client and Server Platforms Revision 1.0 dated January 2016.

Embodiments may provide for an eSPI master device to support more eSPI devices than the number of ports supported by the eSPI master, which may be desirable in a design scenario where the number of needed endpoint devices exceeds the number of unique chip select pins natively supported on a platform.

FIG. 1 illustrates system 100 including an embodiment of the invention. In FIG. 1, an embodiment includes an eSPI port expander 150 including an upstream (i.e., on the host side of eSPI port expander 150) eSPI port 114, which includes circuitry and/or structure to provide the capabilities of an eSPI slave device according to an eSPI specification. The upstream eSPI port 114 may be coupled through an eSPI bus 110 to a host eSPI master port 112 in a host device 102. As such, eSPI port expander 150 includes a dedicated eSPI slave chip select pin connected to a dedicated eSPI master chip select pin on host device 102 and a dedicated eSPI slave alert pin connected to an eSPI master alert pin on host device 102. Additional eSPI slave devices (not shown), each having their own dedicated eSPI slave chip select pins connected to additional dedicated eSPI master chip select pins on host device 102, may also be supported by eSPI bus 110.

The host device 102 may represent a central processing unit (CPU) or other processor component, a platform controller hub (PCH) or other chipset component, a system-on-a-chip (SoC) component, or any other device in a computer system that may include circuitry and/or structure to provide the capabilities of an eSPI master component according to an eSPI specification.

The eSPI port expander 150 may include any number of downstream eSPI ports, each downstream port to support the connection of an eSPI slave device. For example, in FIG. 1, three such downstream eSPI ports (eSPI ports 122, 132, and 142) are shown, connected through three eSPI buses (eSPI buses 120, 130, and 140, respectively) to three eSPI slave devices (eSPI slaves 124, 134, and 144, respectively). The eSPI slave devices (e.g., eSPI slaves 124, 134, 144) may represent and/or include an embedded controller, a baseboard management controller, an input/output (I/O) controller or device, an external flash memory device, a trusted platform module (TPM), or any other device in a computer system that may include circuitry and/or structure to provide the capabilities of an eSPI slave device according to an eSPI specification.

Each of the downstream eSPI ports (e.g., eSPI ports 122, 132, 142) includes circuitry and/or structure to provide the capabilities of an eSPI master according to an eSPI specification. As such, eSPI port expander 150 includes, for each of these downstream eSPI ports (e.g., 122, 132, 142), at least one dedicated eSPI master chip select pin and at least one dedicated eSPI master alert pin, and each of these eSPI slave devices (e.g., eSPI slaves 124, 134, 144) includes a dedicated eSPI slave chip select pin and a dedicated eSPI slave alert pin, each connected to a corresponding one of the eSPI master chip select and alert pins on eSPI port expander 150. Additional eSPI slave devices (not shown), each having their own dedicated eSPI slave chip select connected to additional dedicated eSPI master chip select pins on eSPI port expander 150, may also be supported by eSPI bus 120, 130, and/or 140.

The upstream eSPI port 114 includes circuitry and/or structure to handle, as an eSPI slave device, eSPI bus 110 cycles received from the eSPI master port 112. Accordingly, eSPI port expander 150 includes the standard eSPI capabilities and configuration registers 156. The eSPI capabilities and configuration registers 156 and the information stored in these registers are used to advertise the bus and channel level capabilities of the eSPI port expander 150 and to complete eSPI configuration and initialization of the eSPI port expander 150. The upstream eSPI port 114 also handles in-band and out-of-band resets from host device 102.

For functional cycles on eSPI bus 100, the upstream eSPI port 114 generates and/or checks the bus-level cyclic-redundancy-check (CRC) bytes, adds needed wait states, and provides current status, on behalf of and based on the aggregated information of all eSPI slave devices (e.g., eSPI slaves 124, 134, 144) of eSPI port expander 150, as provided for by the eSPI adaptor/aggregator 160.

The eSPI port expander 150 performs decoding (e.g., by the upstream eSPI port 114) and aggregating (e.g., by the eSPI adaptor/aggregator 160) of eSPI cycles to provide for the expansion of the bus-level and channel-level capabilities of a single upstream eSPI port (e.g., the upstream eSPI port 114) to multiple downstream eSPI ports (e.g., downstream eSPI ports 122, 132, 142).

The eSPI port expander 150 also includes CRC/reset circuitry 152 to support CRC generation/checking and eSPI reset, eSPI initialization circuitry 154 to support the eSPI initialization protocol, alert generation circuitry to support the eSPI alert generation protocol, peripheral channel circuitry 162 to support one or more eSPI peripheral channels, virtual wire channel circuitry 164 to support one or more virtual wire channels, out-of-band channel circuitry 166 to support one or more out-of-band channels, and flash channel circuitry 168 to support one or more flash channels.

Configuration at the bus-level includes the eSPI port expander 150 (e.g., by the eSPI adaptor/aggregator 160) discovering the bus-level capabilities (e.g., I/O, frequency, CRC, wait) of each of its connected eSPI slave devices (e.g., eSPI slaves 124, 134, 144) and determining the least common capabilities (i.e., the capabilities that all the connected eSPI slave devices support), then presenting to the host device 102 (e.g., through eSPI capabilities and configuration registers 156) the least common capabilities as the bus-level capabilities of eSPI port expander 150. The host device 120 may use this information to configure the eSPI port expander 150 as an eSPI slave device. The eSPI port expander 150 broadcasts this configuration to all its connected eSPI slave devices (e.g., eSPI slaves 124, 134, 144).

Configuration at the channel level includes the eSPI port expander 150 (e.g., by the eSPI adaptor/aggregator 160) discovering the channel-level capabilities (e.g., support for peripheral, virtual wire, out-of-band, and flash channels) of each of its connected eSPI slave devices (e.g., eSPI slaves 124, 134, 144) and determining the OR'd result of all these capabilities, then presenting to the host device 102 the OR'd capabilities as the channel-level capabilities of eSPI port expander 150.

Downstream transactions (i.e., from host device 102 toward eSPI slave devices) include the upstream eSPI port 114 decoding each eSPI cycle on eSPI bus 110 and eSPI adaptor/aggregator 160 determining whether to forward the cycle to one of the connected eSPI slave devices (e.g., eSPI slaves 124, 134, 144) or broadcast the cycle to all the connected eSPI slave devices. This forwarding and/or broadcast may be performed without CRC regeneration. For the response phase of the cycle, eSPI adaptor/aggregator 160 aggregates the responses from each of its eSPI slave devices, generates the status and CRC for the aggregated response, and presents the aggregated response to the host device 102 on eSPI bus 110. For example, eSPI port expander 150 presents its FREE status as free if the corresponding FREE flag in all its connected eSPI slave devices (e.g., eSPI slaves 124, 134, 144) are set and presents its AVAIL status as available if the corresponding AVAIL flag in any of its connected eSPI slave devices (e.g., eSPI slaves 124, 134, 144) are set.

Upstream transactions (i.e., toward host device 102 from eSPI slave devices) include eSPI port expander 150 forwarding any alerts from any of its connected eSPI slave devices (e.g., eSPI slaves 124, 134, 144) following the in-band and/or out-of-band alert timing protocol on upstream eSPI port 114.

As mentioned above, each of the downstream eSPI ports (e.g., downstream eSPI ports 122, 132, 142) includes circuitry and/or structure to provide the capabilities of an eSPI master according to an eSPI specification. Each downstream eSPI port (e.g., downstream eSPI ports 122, 132, 142) receives cycles from the eSPI adaptor/aggregator 160 and completes these cycles, as master, on its corresponding eSPI bus (e.g., eSPI bus 120, 130, 140, respectively) with its corresponding eSPI slave device (e.g., eSPI slaves 124, 134, 144, respectively). To serve as an eSPI master, each downstream eSPI port (e.g., downstream eSPI ports 122, 132, 142) includes a CRC generator and an eSPI response decoder.

Figure 2:
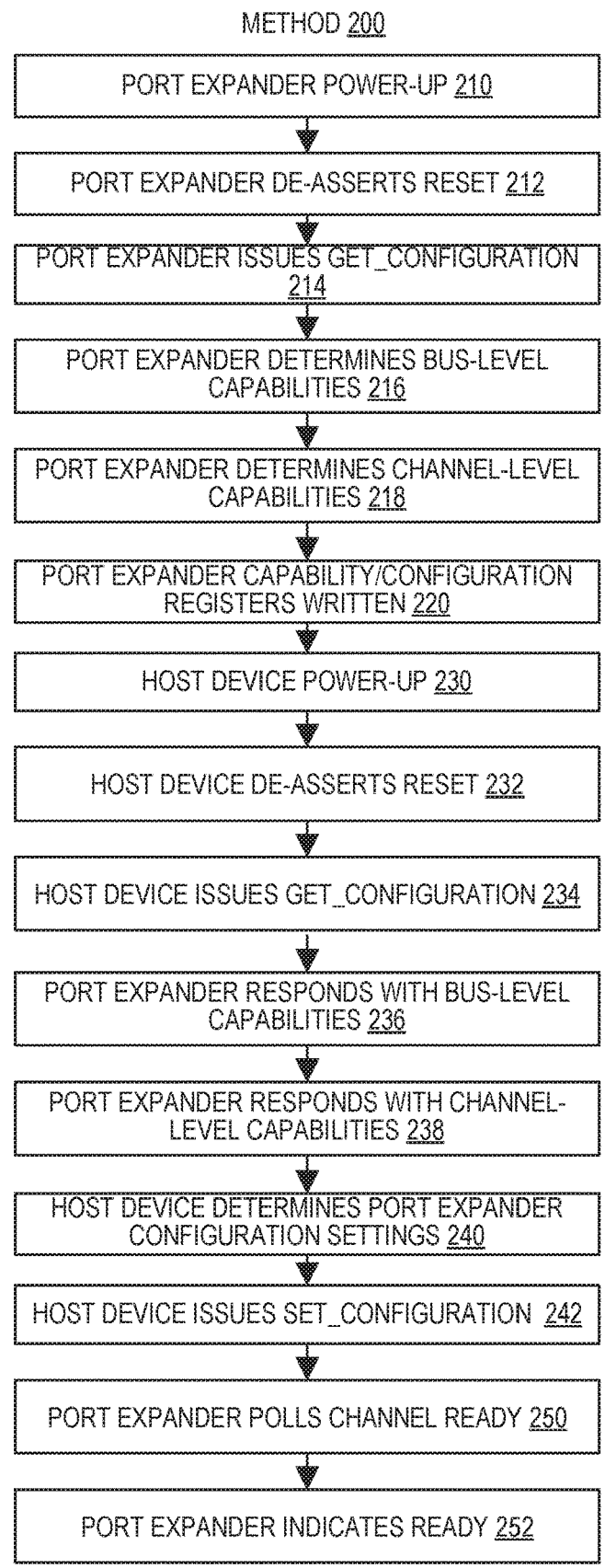
FIG. 2 is a flow diagram of a method including initialization and configuration of an eSPI port expander according to an embodiment of the invention.

FIG. 2 is a flow diagram of method 200 illustrating initialization and configuration of an eSPI port expander, such as the eSPI port expander 150 of FIG. 1, according to an embodiment of the invention.

In block 210, the eSPI port expander is powered up. In block 212, each of the downstream eSPI ports of the eSPI port expander (e.g., downstream eSPI ports 122, 132, 142) de-asserts its eSPI Reset # signal to end the power-up reset on each corresponding eSPI bus (e.g., eSPI bus 120, 130, 140, respectively). In block 214, the eSPI port expander issues GET_CONFIGURATION commands to discover the presence and capabilities of each of its connected slave devices (e.g., eSPI slaves 124, 134, 144). In block 216, the eSPI port expander determines the least common bus-level capabilities of its connected slave devices. In block 218, the eSPI port expander determines the OR'd channel-level capabilities of its connected slave devices.

In block 220, the information collected and determined in blocks 214, 216, and 218 is written to the eSPI capability and configuration registers of the eSPI port expander (e.g., eSPI capabilities and configuration registers 156). In embodiments, the actions represented by block 220 may be performed as part of the actions represented by blocks 214, 216, and/or 218.

In block 230, a host device (e.g., host device 120) to which the eSPI port expander is connected is powered up. In block 232, the eSPI master port (e.g., eSPI master port 112) of the host device de-asserts its eSPI Reset # signal to end the power-up reset on the host eSPI bus (e.g., eSPI bus 110). In block 234, the eSPI master port issues GET_CONFIGURATION commands on the host eSPI bus (e.g., eSPI bus 110) to discover the presence and capabilities of the eSPI port expander. In embodiments, the action represented by block 234 may be repeated any number of times (along with corresponding actions represented by blocks 236 and 238, described below) to complete the GET_CONFIGURATION protocol (e.g., read eSPI capabilities and configuration registers 156).

In block 236, the eSPI port expander responds to one or more of the GET_CONFIGURATION commands represented by block 234 with the least common bus-level capabilities of its connected slave devices, as determined in block 216, including the lowest I/O modes and frequency supported by any its connected eSPI slave devices. In block 238, the eSPI port expander responds to one or more of the GET_CONFIGURATION commands represented by block 234 with the OR'd channel-level capabilities of its connected slave devices, as determined in block 218.

In block 240, the host device determines the configuration settings, including the I/O modes and frequency, for the eSPI port expander, based on the information collected from its GET_CONFIGURATION commands. In block 242, the eSPI master port of the host device issues one or more SET_CONFIGURATION commands to configure the eSPI port expander as determined by the actions of block 240.

In block 250, the eSPI port expander polls the channel ready bits for each configured channel of each of its connected slave devices until each such channel is ready. In block 252, the eSPI port expander. In block 252, after all channels supported by the eSPI port expander are ready, as determined by the actions represented as block 250, the eSPI port expander indicates to the host device that it is ready to accept eSPI transactions (e.g., by setting its peripheral channel ready bit in eSPI capabilities and configuration registers 156).

In method 200 and/or other method embodiments, additional actions may be performed and described actions may be omitted and/or performed in a different order than shown in FIG. 2.

In an embodiment, an apparatus may include an upstream eSPI port, a plurality of downstream eSPI ports, and an eSPI aggregator. The upstream eSPI port is to operate as an eSPI slave on an upstream eSPI bus. Each of the plurality of downstream eSPI ports is to operate as an eSPI master on a corresponding one of a plurality of downstream eSPI buses. The eSPI aggregator is to forward or broadcast transactions from the upstream eSPI bus to one or more of the plurality of downstream eSPI buses and to aggregate responses from one or more of the downstream eSPI buses.

The eSPI aggregator may also be to determine a least common eSPI bus-level capability of a plurality of eSPI slaves connected to the plurality of downstream eSPI buses. The eSPI aggregator may be also to present the least common eSPI bus-level capability of the plurality of eSPI slaves as its bus-level capability on the upstream eSPI bus. The least common eSPI bus-level capability may be one of an input/output, a frequency, a cyclic redundancy check, and a wait capability. The eSPI aggregator may be to determine an OR'd result of eSPI channel-level capabilities of a plurality of eSPI slaves connected to the plurality of downstream eSPI buses. The eSPI aggregator may be to present the OR'd result of eSPI channel-level capabilities of the plurality of eSPI slaves as its channel-level capabilities on the upstream eSPI bus. The eSPI aggregator may be to aggregate a plurality of statuses into an aggregate status to present to the upstream eSPI bus, each of the plurality of statuses corresponding to one of a plurality of eSPI slaves connected to the plurality of downstream eSPI buses. The aggregate status may be to indicate whether the apparatus is free. The aggregate status may be presented as free if a corresponding status of all the plurality of eSPI slaves is free. The aggregate status may be to indicate whether the apparatus is available. The aggregate status may be presented as free if a corresponding status of any of the plurality of eSPI slaves is available. The aggregate status may be to indicate whether a channel is ready. The aggregate status may be presented as ready if a corresponding status of all the plurality of eSPI slaves is ready. The apparatus may also include eSPI configuration registers to store, as eSPI configuration information of the apparatus, aggregated eSPI configuration information of a plurality of eSPI slaves connected to the plurality of downstream eSPI buses.

In an embodiment, a method may include issuing, by an enhanced serial peripheral interconnect (eSPI) port expander, a plurality of commands on a plurality of downstream eSPI buses to discover the capabilities of a plurality of eSPI slave devices connected to the plurality of downstream eSPI buses; aggregating, by the eSPI port expander, the capabilities of the plurality of eSPI slave devices into an aggregated capability of the eSPI port expander; and presenting, by the eSPI port expander, the aggregated capability of the eSPI port expander on an upstream eSPI bus.

The aggregated capability may be a least common bus-level capability of the plurality of eSPI slave devices. The aggregated capability may be an OR'd result of channel level capabilities of the plurality of eSPI slave devices.

In an embodiment, a system may include an upstream enhanced serial peripheral interface (eSPI) bus; a host device to operate as a master on the upstream eSPI bus; a plurality of downstream eSPI buses; a plurality of eSPI slave devices, each connected to a corresponding one of the plurality of downstream eSPI buses; and an eSPI port expander including an upstream eSPI port to operate as an eSPI slave on the upstream eSPI bus; a plurality of downstream eSPI ports, each to operate as an eSPI master on a corresponding one of the plurality of downstream eSPI buses; and an eSPI aggregator to forward or broadcast transactions from the upstream eSPI bus to one or more of the plurality of downstream eSPI buses and to aggregate responses from one or more of the downstream eSPI buses.

The eSPI aggregator may also be to determine a least common eSPI bus-level capability of a plurality of eSPI slaves connected to the plurality of downstream eSPI buses, and to present the least common eSPI bus-level capability of the plurality of eSPI slaves as its bus-level capability on the upstream eSPI bus. The eSPI aggregator may also be to determine an OR'd result of eSPI channel-level capabilities of a plurality of eSPI slaves connected to the plurality of downstream eSPI buses, and to present the OR'd result of eSPI channel-level capabilities of the plurality of eSPI slaves as its channel-level capabilities on the upstream eSPI bus.

In an embodiment, an apparatus may include an upstream eSPI port to operate as an eSPI slave on an upstream eSPI bus; a plurality of downstream eSPI ports, each to operate as an eSPI master on a corresponding one of a plurality of downstream eSPI buses; means for forwarding or broadcasting transactions from the upstream eSPI bus to one or more of the plurality of downstream eSPI buses; and means for aggregating responses from one or more of the downstream eSPI buses aggregator.

The apparatus may also include means for determining a least common eSPI bus-level capability of a plurality of eSPI slaves connected to the plurality of downstream eSPI buses. The apparatus may also include means for presenting the least common eSPI bus-level capability of the plurality of eSPI slaves as its bus-level capability on the upstream eSPI bus. The least common eSPI bus-level capability may be one of an input/output, a frequency, a cyclic redundancy check, and a wait capability. The apparatus may also include means for determining an OR'd result of eSPI channel-level capabilities of a plurality of eSPI slaves connected to the plurality of downstream eSPI buses. The apparatus may also include means for presenting the OR'd result of eSPI channel-level capabilities of the plurality of eSPI slaves as its channel-level capabilities on the upstream eSPI bus. The apparatus may also include means for aggregating a plurality of statuses into an aggregate status to present to the upstream eSPI bus, each of the plurality of statuses corresponding to one of a plurality of eSPI slaves connected to the plurality of downstream eSPI buses. The aggregate status may be to indicate whether the apparatus is free. The aggregate status may be presented as free if a corresponding status of all the plurality of eSPI slaves is free. The aggregate status may be to indicate whether the apparatus is available. The aggregate status may be presented as free if a corresponding status of any of the plurality of eSPI slaves is available. The aggregate status may be to indicate whether a channel is ready. The aggregate status may be presented as ready if a corresponding status of all the plurality of eSPI slaves is ready. The apparatus may also include means for storing, as eSPI configuration information of the apparatus, aggregated eSPI configuration information of a plurality of eSPI slaves connected to the plurality of downstream eSPI buses.

In an embodiment, an apparatus may comprise a data storage device that stores code that when executed by a hardware processor causes the hardware processor to perform any method disclosed herein. An apparatus may be as described in the detailed description. A method may be as described in the detailed description.

In an embodiment, a non-transitory machine-readable medium may store code that when executed by a machine causes the machine to perform a method comprising any method disclosed herein.

Circuitry (e.g., a hub, host, and/or device) may include a transmitter and/or a receiver to send and receive data, respectively, e.g., as part of a transceiver (e.g., a physical layer (PHY) circuit). Circuitry may connect via a cable, which may include a plug received by a receptacle.

One interconnect fabric architecture that may be included in systems embodying the invention is the Peripheral Component Interconnect (PCI) Express (PCIe) architecture. A primary goal of PCIe is to enable components and devices from different vendors to inter-operate in an open architecture, spanning multiple market segments; Clients (Desktops and Mobile), Servers (Standard and Enterprise), and Embedded and Communication devices. PCI Express is a high performance, general purpose I/O interconnect defined for a wide variety of future computing and communication platforms. Some PCI attributes, such as its usage model, load-store architecture, and software interfaces, have been maintained through its revisions, whereas previous parallel bus implementations have been replaced by a highly scalable, fully serial interface. The more recent versions of PCI Express take advantage of advances in point-to-point interconnects, Switch-based technology, and packetized protocol to deliver new levels of performance and features. Power Management, Quality of Service (QoS), Hot-Plug/Hot-Swap support, Data Integrity, and Error Handling are among some of the advanced features supported by PCI Express.

Figure 3:
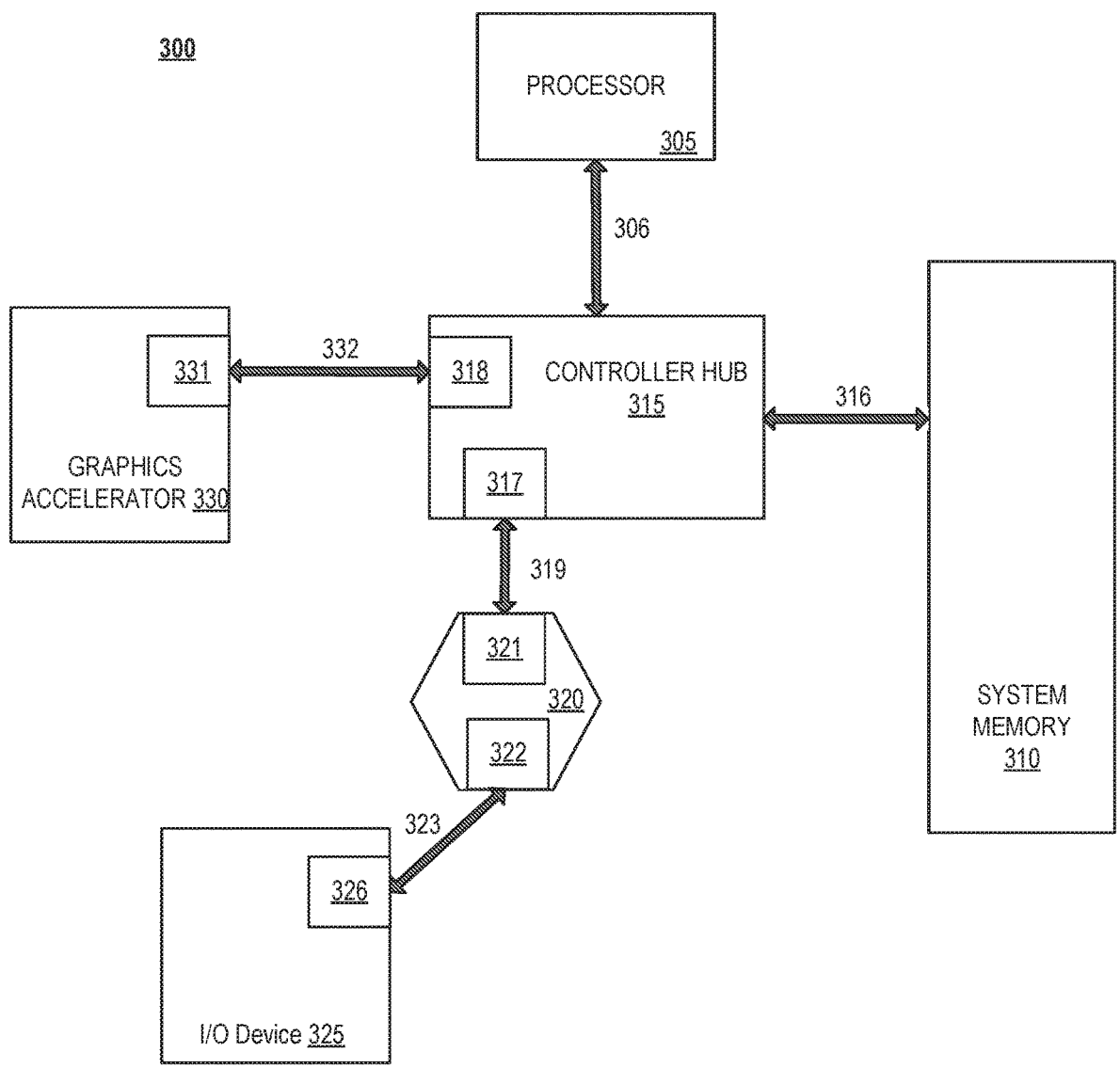
FIG. 3 illustrates a computing system including a peripheral component interconnect express (PCIe) compliant architecture according to embodiments.

Referring to FIG. 3, a computing system including a peripheral component interconnect express (PCIe) compliant architecture and which may include an embodiment of the invention is illustrated. System 300 includes processor 305 (which may correspond to host component 102 in FIG. 1) and system memory 310 coupled to controller hub 315. Processor 305 includes any processing element, such as a microprocessor, a host processor, an embedded processor, a co-processor, or other processor. Processor 305 is coupled to controller hub 315 through front-side bus (FSB) 306. In one embodiment, FSB 306 is a serial point-to-point interconnect as described below. In another embodiment, link 306 includes a serial, differential interconnect architecture that is compliant with different interconnect standard.

System memory 310 includes any memory device, such as random-access memory (RAM), non-volatile (NV) memory, or other memory accessible by devices in system 300. System memory 310 is coupled to controller hub 315 through memory interface 316. Examples of a memory interface include a double-data rate (DDR) memory interface, a dual-channel DDR memory interface, and a dynamic RAM (DRAM) memory interface.

In one embodiment, controller hub 315 is a root hub, root complex, or root controller in a Peripheral Component Interconnect Express (PCIe or PCIE) interconnection hierarchy. Examples of controller hub 315 include a chipset, a memory controller hub (MCH), a northbridge, an interconnect controller hub (ICH) a southbridge, and a root controller/hub. Often the term chipset refers to two physically separate controller hubs, e.g., a memory controller hub (MCH) coupled to an interconnect controller hub (ICH). Note that current systems often include the MCH integrated with processor 305, while controller 315 is to communicate with I/O devices, in a similar manner as described below. In some embodiments, peer-to-peer routing is optionally supported through root complex 315.

Here, controller hub 315 is coupled to switch/bridge 320 through serial link 319. Input/output modules 317 and 321, which may also be referred to as interfaces/ports 317 and 321, include/implement a layered protocol stack to provide communication between controller hub 315 and switch 320. In one embodiment, multiple devices are capable of being coupled to switch 320.

Switch/bridge 320 routes packets/messages from device 325 upstream, e.g., up a hierarchy towards a root complex, to controller hub 315 and downstream, e.g., down a hierarchy away from a root controller, from processor 305 or system memory 310 to device 325. Switch 320, in one embodiment, is referred to as a logical assembly of multiple virtual PCI-to-PCI bridge devices. Device 325 includes any internal or external device or component to be coupled to an electronic system, such as an I/O device, a Network Interface Controller (NIC), an add-in card, an audio processor, a network processor, a hard-drive, a storage device, a CD/DVD ROM, a monitor, a printer, a mouse, a keyboard, a router, a portable storage device, a Firewire device, a Universal Serial Bus (USB) device, a scanner, and other input/output devices. Often in the PCIe vernacular, such as device, is referred to as an endpoint. Although not specifically shown, device 325 may include a PCIe to PCI/PCI-X bridge to support legacy or other version PCI devices. Endpoint devices in PCIe are often classified as legacy, PCIe, or root complex integrated endpoints.

Graphics accelerator 330 is also coupled to controller hub 315 through serial link 332. In one embodiment, graphics accelerator 330 is coupled to an MCH, which is coupled to an ICH. Switch 320, and accordingly to I/O device 325 through serial link 323, is then coupled to the ICH. I/O modules 331 and 318 are also to implement a layered protocol stack to communicate between graphics accelerator 330 and controller hub 315. Similar to the MCH discussion above, a graphics controller or the graphics accelerator 330 itself may be integrated in processor 305.

An eSPI port expander may be included in or connected to controller hub 315, included in or connected to switch/bridge 320, or included in or connected to another component, shown or not shown, in a system such as that illustrated in FIG. 3.

Figure 4:
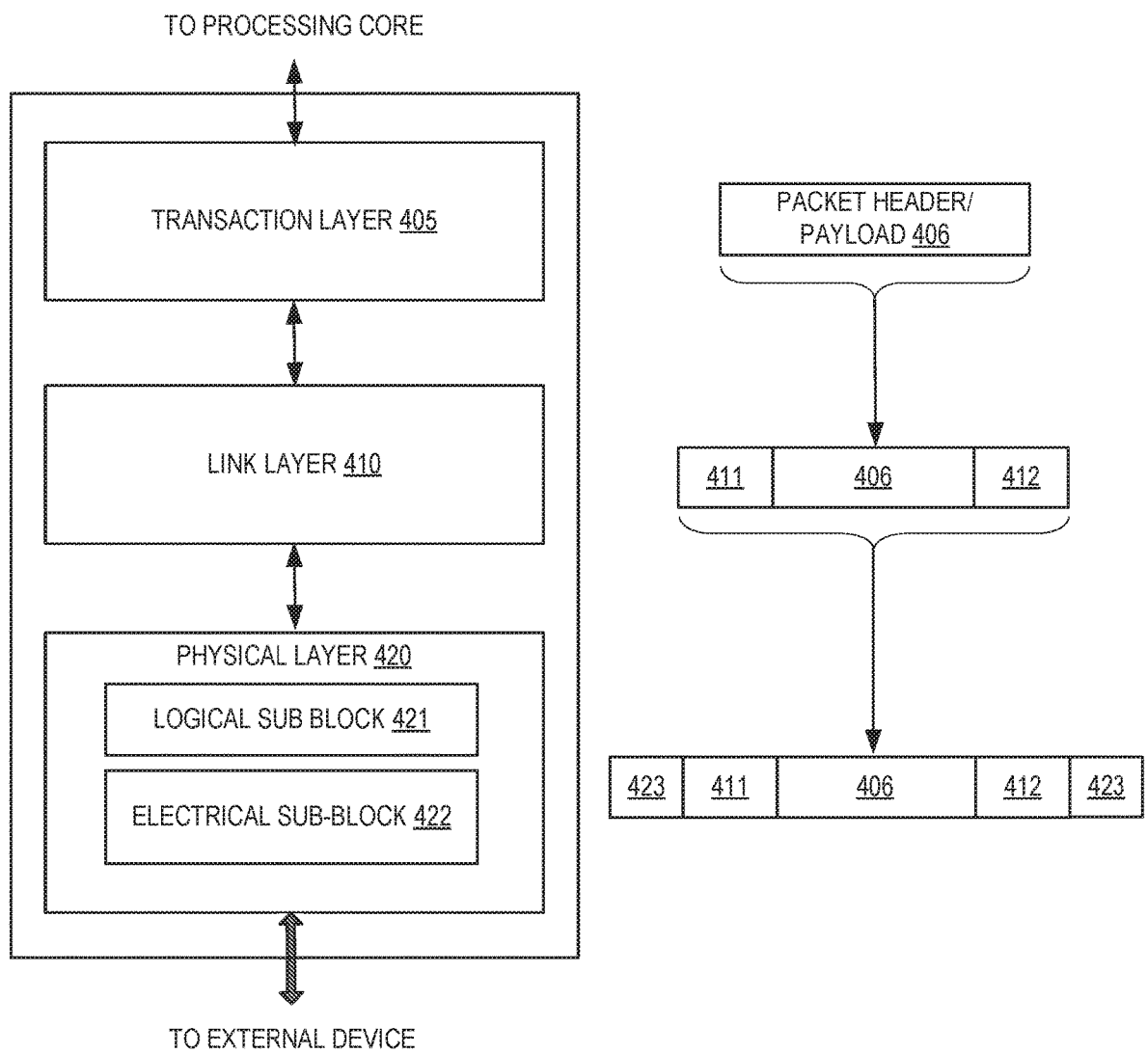
FIG. 4 illustrates a PCIe compliant interconnect architecture including a layered stack according to embodiments.

Turning to FIG. 4 an embodiment of a layered protocol stack is illustrated. Layered protocol stack 400 includes any form of a layered communication stack, such as a Quick Path Interconnect (QPI) stack, a PCIe stack, a next generation high performance computing interconnect stack, or other layered stack. Although the discussion immediately below in reference to FIGS. 3-4 are in relation to a PCIe stack, the same concepts may be applied to other interconnect stacks. In one embodiment, protocol stack 400 is a PCIe protocol stack including transaction layer 405, link layer 410, and physical layer 420. An interface, such as interfaces 317, 318, 321, 322, 326, and 331 in FIG. 3, may be represented as communication protocol stack 400. Representation as a communication protocol stack may also be referred to as a module or interface implementing/including a protocol stack.

PCI Express uses packets to communicate information between components. Packets are formed in the Transaction Layer 405 and Data Link Layer 410 to carry the information from the transmitting component to the receiving component. As the transmitted packets flow through the other layers, they are extended with additional information necessary to handle packets at those layers. At the receiving side the reverse process occurs and packets get transformed from their Physical Layer 420 representation to the Data Link Layer 410 representation and finally (for Transaction Layer Packets) to the form that can be processed by the Transaction Layer 405 of the receiving device.

Transaction Layer

In one embodiment, transaction layer 405 is to provide an interface between a device's processing core and the interconnect architecture, such as data link layer 410 and physical layer 420. In this regard, a primary responsibility of the transaction layer 405 is the assembly and disassembly of packets (e.g., transaction layer packets, or TLPs). The translation layer 405 typically manages credit-base flow control for TLPs. PCIe implements split transactions, e.g., transactions with request and response separated by time, allowing a link to carry other traffic while the target device gathers data for the response.

In addition, PCIe utilizes credit-based flow control. In this scheme, a device advertises an initial amount of credit for each of the receive buffers in Transaction Layer 405. An external device at the opposite end of the link, such as a controller hub 315 in FIG. 3, counts the number of credits consumed by each TLP. A transaction may be transmitted if the transaction does not exceed a credit limit. Upon receiving a response an amount of credit is restored. An advantage of a credit scheme is that the latency of credit return does not affect performance, provided that the credit limit is not encountered.

In one embodiment, four transaction address spaces include a configuration address space, a memory address space, an input/output address space, and a message address space. Memory space transactions include one or more of read requests and write requests to transfer data to/from a memory-mapped location. In one embodiment, memory space transactions are capable of using two different address formats, e.g., a short address format, such as a 32-bit address, or a long address format, such as 64-bit address. Configuration space transactions are used to access configuration space of the PCIe devices. Transactions to the configuration space include read requests and write requests. Message space transactions (or, simply messages) are defined to support in-band communication between PCIe agents.

Therefore, in one embodiment, transaction layer 405 assembles packet header/payload 406. Format for current packet headers/payloads may be found in the PCIe specification at the PCIe specification website.

Figure 5:
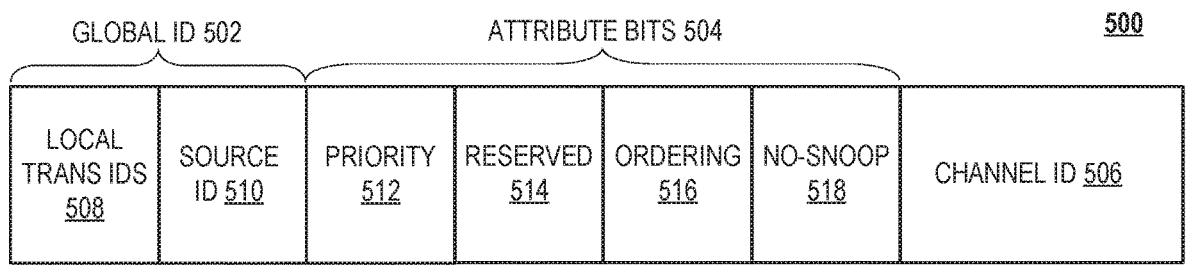
FIG. 5 illustrates a PCIe compliant request or packet to be generated or received within an interconnect architecture according to embodiments.

Referring to FIG. 5, an embodiment of a PCIe transaction descriptor is illustrated. In one embodiment, transaction descriptor 500 is a mechanism for carrying transaction information. In this regard, transaction descriptor 500 supports identification of transactions in a system. Other potential uses include tracking modifications of default transaction ordering and association of transaction with channels.

Transaction descriptor 500 includes global identifier field 502, attributes field 504 and channel identifier field 506. In the illustrated example, global identifier field 502 is depicted comprising local transaction identifier field 508 and source identifier field 510. In one embodiment, global transaction identifier 502 is unique for all outstanding requests.

According to one implementation, local transaction identifier field 508 is a field generated by a requesting agent, and it is unique for all outstanding requests that require a completion for that requesting agent. Furthermore, in this example, source identifier 510 uniquely identifies the requestor agent within a PCIe hierarchy. Accordingly, together with source ID 510, local transaction identifier 508 field provides global identification of a transaction within a hierarchy domain.

Attributes field 504 specifies characteristics and relationships of the transaction. In this regard, attributes field 504 is potentially used to provide additional information that allows modification of the default handling of transactions. In one embodiment, attributes field 504 includes priority field 512, reserved field 514, ordering field 516, and no-snoop field 518. Here, priority sub-field 512 may be modified by an initiator to assign a priority to the transaction. Reserved attribute field 514 is left reserved for future, or vendor-defined usage. Possible usage models using priority or security attributes may be implemented using the reserved attribute field.

In this example, ordering attribute field 516 is used to supply optional information conveying the type of ordering that may modify default ordering rules. According to one example implementation, an ordering attribute of "0" denotes default ordering rules are to apply, wherein an ordering attribute of "1" denotes relaxed ordering, wherein writes can pass writes in the same direction, and read completions can pass writes in the same direction. Snoop attribute field 518 is utilized to determine if transactions are snooped. As shown, channel ID Field 506 identifies a channel that a transaction is associated with.

Link Layer

Link layer 410, also referred to as data link layer 410, acts as an intermediate stage between transaction layer 405 and the physical layer 420. In one embodiment, a responsibility of the data link layer 410 is providing a reliable mechanism for exchanging Transaction Layer Packets (TLPs) between two components a link. One side of the Data Link Layer 410 accepts TLPs assembled by the Transaction Layer 405, applies packet sequence identifier 411, e.g., an identification number or packet number, calculates and applies an error detection code, e.g., CRC 412, and submits the modified TLPs to the Physical Layer 420 for transmission across a physical to an external device.

Physical Layer

In one embodiment, physical layer 420 includes logical sub block 421 and electrical sub-block 422 to physically transmit a packet to an external device. Here, logical sub-block 421 is responsible for the "digital" functions of Physical Layer 421. In this regard, the logical sub-block includes a transmit section to prepare outgoing information for transmission by physical sub-block 422, and a receiver section to identify and prepare received information before passing it to the Link Layer 410.

Physical block 422 includes a transmitter and a receiver. The transmitter is supplied by logical sub-block 421 with symbols, which the transmitter serializes and transmits onto to an external device. The receiver is supplied with serialized symbols from an external device and transforms the received signals into a bit-stream. The bit-stream is de-serialized and supplied to logical sub-block 421. In one embodiment, an 8b/10b transmission code is employed, where ten-bit symbols are transmitted/received. Here, special symbols are used to frame a packet with frames 423. In addition, in one example, the receiver also provides a symbol clock recovered from the incoming serial stream.

As stated above, although transaction layer 405, link layer 410, and physical layer 420 are discussed in reference to a specific embodiment of a PCIe protocol stack, a layered protocol stack is not so limited. In fact, any layered protocol may be included/implemented. As an example, a port/interface that is represented as a layered protocol includes: (1) a first layer to assemble packets, e.g., a transaction layer; a second layer to sequence packets, e.g., a link layer; and a third layer to transmit the packets, e.g., a physical layer. As a specific example, a common standard interface (CSI) layered protocol is utilized.

Figure 6:
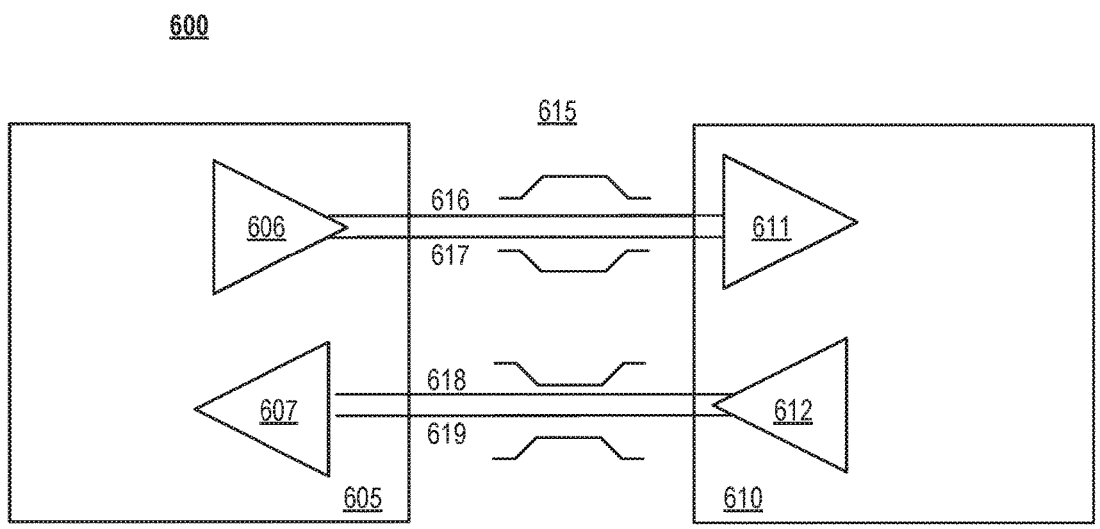
FIG. 6 illustrates a transmitter and receiver pair for a PCIe compliant interconnect architecture according to embodiments.

Referring next to FIG. 6, an embodiment of a PCIe serial point to point fabric 600 is illustrated. Although an embodiment of a PCIe serial point-to-point link is illustrated, a serial point-to-point link is not so limited, as it includes any transmission path for transmitting serial data. In the embodiment shown, a basic PCIe link includes two, low-voltage, differentially driven signal pairs: a transmit pair 606/611 and a receive pair 612/607. Accordingly, device 605 includes transmission logic 606 to transmit data to device 610 and receiving logic 607 to receive data from device 610. In other words, two transmitting paths, e.g., paths 616 and 617, and two receiving paths, e.g., paths 618 and 619, are included in a PCIe link.

A transmission path refers to any path for transmitting data, such as a transmission line, a copper line, an optical line, a wireless communication channel, an infrared communication link, or other communication path. A connection between two devices, such as device 605 and device 610, is referred to as a link, such as link 615. A link may support one lane—each lane representing a set of differential signal pairs (one pair for transmission, one pair for reception). To scale bandwidth, a link may aggregate multiple lanes denoted by xN, where N is any supported Link width, such as 1, 2, 4, 8, 12, 16, 32, 64, or wider.

A differential pair refers to two transmission paths, such as lines 616 and 617, to transmit differential signals. As an example, when line 616 toggles from a low voltage level to a high voltage level, e.g., a rising edge, line 617 drives from a high logic level to a low logic level, e.g., a falling edge. Differential signals potentially demonstrate better electrical characteristics, such as better signal integrity, e.g., cross-coupling, voltage overshoot/undershoot, ringing, etc. This allows for better timing window, which enables faster transmission frequencies.

Figure 7:
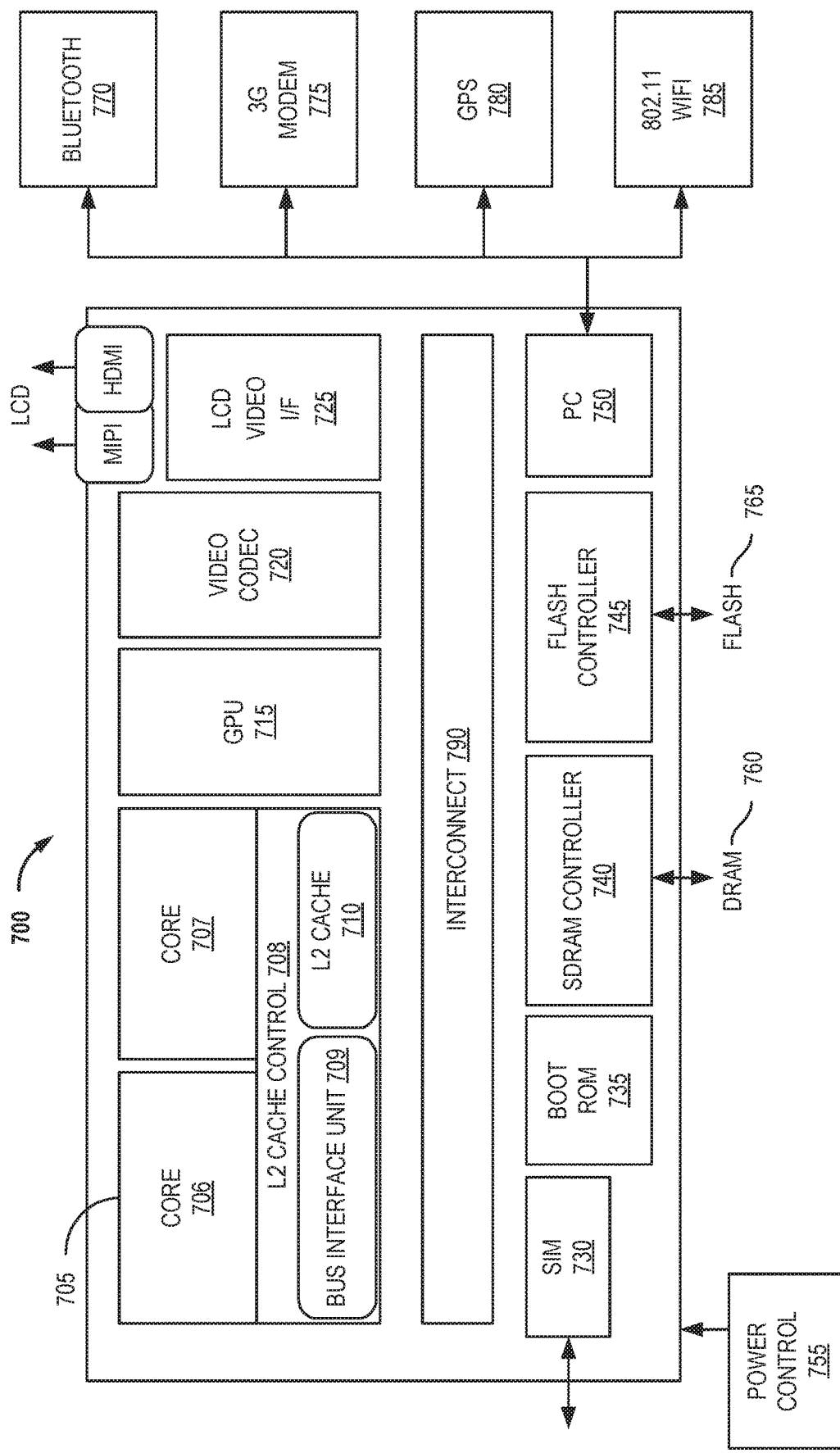
FIG. 7 illustrates a computing system on a chip according to embodiments.

Turning next to FIG. 7, an embodiment of a system on-chip (SOC) design which may include an embodiment of the invention is depicted. As a specific illustrative example, SOC 700 is included in user equipment (UE). In one embodiment, UE refers to any device to be used by an end-user to communicate, such as a hand-held phone, smart-phone, tablet, ultra-thin notebook, notebook with broadband adapter, or any other similar communication device. Often a UE connects to a base station or node, which potentially corresponds in nature to a mobile station (MS) in a GSM network.

Here, SOC 700 includes 2 cores—706 and 707. Similar to the discussion above, cores 706 and 707 may conform to an Instruction Set Architecture, such as an Intel® Architecture Core™-based processor, an Advanced Micro Devices, Inc. (AMD) processor, a MIPS-based processor, an ARM-based processor design, or a customer thereof, as well as their licensees or adopters. Cores 706 and 707 are coupled to cache control 708 that is associated with bus interface unit 709 and L2 cache 710 to communicate with other parts of system 700. Interconnect 790 includes an on-chip interconnect, such as an IOSF, AMBA, or other interconnect discussed above, which potentially implements one or more aspects of the described embodiments.

Interconnect 790 provides communication channels to the other components, such as a Subscriber Identity Module (SIM) 730 to interface with a SIM card, a boot ROM 735 to hold boot code for execution by cores 706 and 707 to initialize and boot SOC 700, a SDRAM controller 740 to interface with external memory (e.g. DRAM 760), a flash controller 745 to interface with non-volatile memory (e.g. Flash 765), a peripheral control 750 (e.g. Serial Peripheral Interface) to interface with peripherals, video codecs 720 and Video interface 725 to display and receive input (e.g. touch enabled input), GPU 715 to perform graphics related computations, etc. Any of these interfaces may incorporate aspects of the embodiments described herein.

SOC 700 may also include, as represented by, instead of, or in addition to PC 750, an eSPI port expander according to embodiments of the invention.

In addition, the system illustrates peripherals for communication, such as a Bluetooth module 770, 3G modem 775, GPS 780, and WiFi 785. Note as stated above, a UE includes a radio for communication. As a result, these peripheral communication modules are not all required. However, in a UE some form a radio for external communication is to be included.

Note that the apparatus, methods, and systems described above may be implemented in any electronic device or system as aforementioned. As specific illustrations, the figures below provide exemplary systems for utilizing the embodiments as described herein. As the systems below are described in more detail, a number of different interconnects are disclosed, described, and revisited from the discussion above. And as is readily apparent, the advances described above may be applied to any of those interconnects, fabrics, or architectures.

Figure 8:
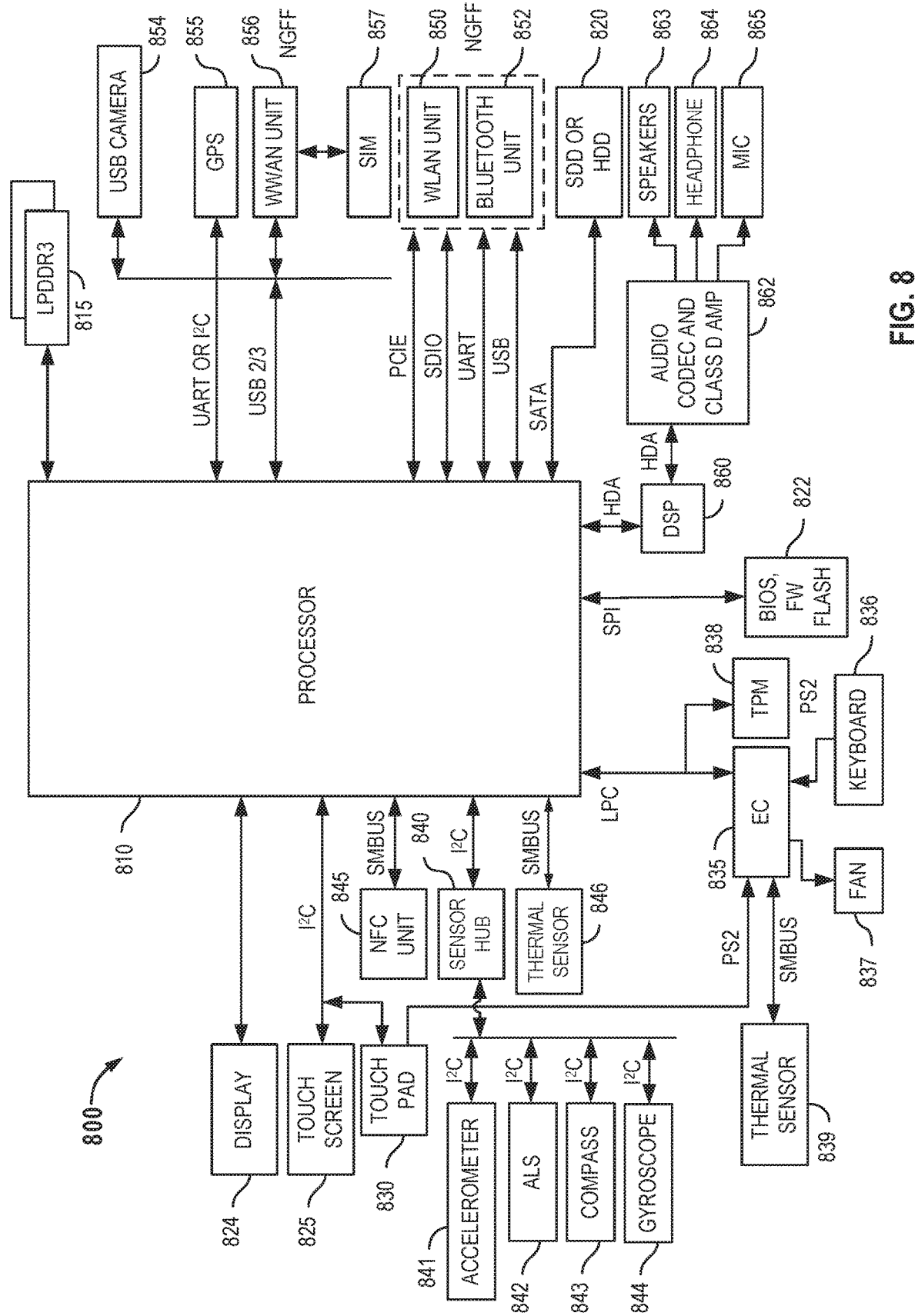
FIG. 8 illustrates a computing system according to an embodiment.

Referring now to FIG. 8, a block diagram of components present in a computer system in accordance with embodiments of the disclosure is illustrated. As shown in FIG. 8, system 800 includes any combination of components. These components may be implemented as ICs, portions thereof, discrete electronic devices, or other modules, logic, hardware, software, firmware, or a combination thereof adapted in a computer system, or as components otherwise incorporated within a chassis of the computer system. Note also that the block diagram of FIG. 8 is intended to show a high-level view of many components of the computer system. However, it is to be understood that some of the components shown may be omitted, additional components may be present, and different arrangement of the components shown may occur in other implementations. As a result, the embodiments described above may be implemented in any portion of one or more of the interconnects illustrated or described below.

As seen in FIG. 8, a processor 810 (which may correspond to host device 102 in FIG. 1), in one embodiment, includes a microprocessor, multi-core processor, multithreaded processor, an ultra-low voltage processor, an embedded processor, or another known processing element. In the illustrated implementation, processor 810 acts as a main processing unit and central hub for communication with many of the various components of the system 800. As one example, processor 810 is implemented as a system on a chip (SoC). As a specific illustrative example, processor 810 includes an Intel® Architecture Core™-based processor such as an i3, i5, i7 or another such processor available from Intel Corporation, Santa Clara, Calif. However, understand that other low power processors such as available from Advanced Micro Devices, Inc. (AMD) of Sunnyvale, Calif., a MIPS-based design from MIPS Technologies, Inc. of Sunnyvale, Calif., an ARM-based design licensed from ARM Holdings, Ltd. or customer thereof, or their licensees or adopters may instead be present in other embodiments such as an Apple A5/A6 processor, a Qualcomm Snapdragon processor, or TI OMAP processor. Note that many of the customer versions of such processors are modified and varied; however, they may support or recognize a specific instructions set that performs defined algorithms as set forth by the processor licensor. Here, the microarchitectural implementation may vary, but the architectural function of the processor is usually consistent. Certain details regarding the architecture and operation of processor 810 in one implementation will be discussed further below to provide an illustrative example.

Processor 810, in one embodiment, communicates with a system memory 815. As an illustrative example, which in an embodiment can be implemented via multiple memory devices to provide for a given amount of system memory. As examples, the memory can be in accordance with a Joint Electron Devices Engineering Council (JEDEC) low power double data rate (LPDDR)-based design such as the current LPDDR2 standard according to JEDEC JESD 209-2E (published April 2009), or a next generation LPDDR standard to be referred to as LPDDR3 or LPDDR4 that will offer extensions to LPDDR2 to increase bandwidth. In various implementations the individual memory devices may be of different package types such as single die package (SDP), dual die package (DDP) or quad die package (QDP). These devices, in some embodiments, are directly soldered onto a motherboard to provide a lower profile solution, while in other embodiments the devices are configured as one or more memory modules that in turn couple to the motherboard by a given connector. And of course, other memory implementations are possible such as other types of memory modules, e.g., dual inline memory modules (DIMMs) of different varieties including but not limited to microDIMMs, MiniDIMMs. In a particular illustrative embodiment, memory is sized between 2 GB and 16 GB, and may be configured as a DDR3LM package or an LPDDR2 or LPDDR3 memory that is soldered onto a motherboard via a ball grid array (BGA).

To provide for persistent storage of information such as data, applications, one or more operating systems and so forth, a mass storage 820 may also couple to processor 810. In various embodiments, to enable a thinner and lighter system design as well as to improve system responsiveness, this mass storage may be implemented via a SSD. However in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also shown in FIG. 8, a flash device 822 may be coupled to processor 810, e.g., via a serial peripheral interface (SPI). This flash device may provide for non-volatile storage of system software, including a basic input/output software (BIOS) as well as other firmware of the system.

In various embodiments, mass storage of the system is implemented by a SSD alone or as a disk, optical or other drive with an SSD cache. In some embodiments, the mass storage is implemented as a SSD or as a HDD along with a restore (RST) cache module. In various implementations, the HDD provides for storage of between 320 GB-4 terabytes (TB) and upward while the RST cache is implemented with a SSD having a capacity of 24 GB-256 GB. Note that such SSD cache may be configured as a single level cache (SLC) or multi-level cache (MLC) option to provide an appropriate level of responsiveness. In a SSD-only option, the module may be accommodated in various locations such as in a mSATA or NGFF slot. As an example, an SSD has a capacity ranging from 120 GB-1 TB.

Various input/output (IO) devices may be present within system 800. Specifically shown in the embodiment of FIG. 8 is a display 824 which may be a high definition LCD or LED panel configured within a lid portion of the chassis. This display panel may also provide for a touch screen 825, e.g., adapted externally over the display panel such that via a user's interaction with this touch screen, user inputs can be provided to the system to enable desired operations, e.g., with regard to the display of information, accessing of information and so forth. In one embodiment, display 824 may be coupled to processor 810 via a display interconnect that can be implemented as a high-performance graphics interconnect. Touch screen 825 may be coupled to processor 810 via another interconnect, which in an embodiment can be an I$^2$C interconnect. As further shown in FIG. 8, in addition to touch screen 825, user input by way of touch can also occur via a touch pad 830 which may be configured within the chassis and may also be coupled to the same I$^2$C interconnect as touch screen 825.

The display panel may operate in multiple modes. In a first mode, the display panel can be arranged in a transparent state in which the display panel is transparent to visible light. In various embodiments, the majority of the display panel may be a display except for a bezel around the periphery. When the system is operated in a notebook mode and the display panel is operated in a transparent state, a user may view information that is presented on the display panel while also being able to view objects behind the display. In addition, information displayed on the display panel may be viewed by a user positioned behind the display. Or the operating state of the display panel can be an opaque state in which visible light does not transmit through the display panel.

In a tablet mode the system is folded shut such that the back display surface of the display panel comes to rest in a position such that it faces outwardly towards a user, when the bottom surface of the base panel is rested on a surface or held by the user. In the tablet mode of operation, the back display surface performs the role of a display and user interface, as this surface may have touch screen functionality and may perform other known functions of a conventional touch screen device, such as a tablet device. To this end, the display panel may include a transparency-adjusting layer that is disposed between a touch screen layer and a front display surface. In some embodiments the transparency-adjusting layer may be an electrochromic layer (EC), a LCD layer, or a combination of EC and LCD layers.

In various embodiments, the display can be of different sizes, e.g., an 11.6" or a 13.3" screen, and may have a 16:9 aspect ratio, and at least 300 nits brightness. Also the display may be of full high definition (HD) resolution (at least 1920×1080p), be compatible with an embedded display port (eDP), and be a low power panel with panel self-refresh.

As to touch screen capabilities, the system may provide for a display multi-touch panel that is multi-touch capacitive and being at least 5 finger capable. And in some embodiments, the display may be 10 finger capable. In one embodiment, the touch screen is accommodated within a damage and scratch-resistant glass and coating (e.g., Gorilla Glass™ or Gorilla Glass 2™) for low friction to reduce "finger burn" and avoid "finger skipping". To provide for an enhanced touch experience and responsiveness, the touch panel, in some implementations, has multi-touch functionality, such as less than 2 frames (30 Hz) per static view during pinch zoom, and single-touch functionality of less than 1 cm per frame (30 Hz) with 200 ms (lag on finger to pointer). The display, in some implementations, supports edge-to-edge glass with a minimal screen bezel that is also flush with the panel surface, and limited IO interference when using multi-touch.

For perceptual computing and other purposes, various sensors may be present within the system and may be coupled to processor 810 in different manners. Certain inertial and environmental sensors may couple to processor 810 through a sensor hub 840, e.g., via an I$^2$C interconnect. In the embodiment shown in FIG. 8, these sensors may include an accelerometer 841, an ambient light sensor (ALS) 842, a compass 843 and a gyroscope 844. Other environmental sensors may include one or more thermal sensors 846 which in some embodiments couple to processor 810 via a system management bus (SMBus) bus.

Using the various inertial and environmental sensors present in a platform, many different use cases may be realized. These use cases enable advanced computing operations including perceptual computing and also allow for enhancements with regard to power management/battery life, security, and system responsiveness.

For example with regard to power management/battery life issues, based at least on part on information from an ambient light sensor, the ambient light conditions in a location of the platform are determined and intensity of the display controlled accordingly. Thus, power consumed in operating the display is reduced in certain light conditions.

As to security operations, based on context information obtained from the sensors such as location information, it may be determined whether a user is allowed to access certain secure documents. For example, a user may be permitted to access such documents at a work place or a home location. However, the user is prevented from accessing such documents when the platform is present at a public location. This determination, in one embodiment, is based on location information, e.g., determined via a GPS sensor or camera recognition of landmarks. Other security operations may include providing for pairing of devices within a close range of each other, e.g., a portable platform as described herein and a user's desktop computer, mobile telephone or so forth. Certain sharing, in some implementations, are realized via near field communication when these devices are so paired. However, when the devices exceed a certain range, such sharing may be disabled. Furthermore, when pairing a platform as described herein and a smartphone, an alarm may be configured to be triggered when the devices move more than a predetermined distance from each other, when in a public location. In contrast, when these paired devices are in a safe location, e.g., a work place or home location, the devices may exceed this predetermined limit without triggering such alarm.

Responsiveness may also be enhanced using the sensor information. For example, even when a platform is in a low power state, the sensors may still be enabled to run at a relatively low frequency. Accordingly, any changes in a location of the platform, e.g., as determined by inertial sensors, GPS sensor, or so forth is determined. If no such changes have been registered, a faster connection to a previous wireless hub such as a Wi-Fi™ access point or similar wireless enabler occurs, as there is no need to scan for available wireless network resources in this case. Thus, a greater level of responsiveness when waking from a low power state is achieved.

It is to be understood that many other use cases may be enabled using sensor information obtained via the integrated sensors within a platform as described herein, and the above examples are only for purposes of illustration. Using a system as described herein, a perceptual computing system may allow for the addition of alternative input modalities, including gesture recognition, and enable the system to sense user operations and intent.

In some embodiments one or more infrared or other heat sensing elements, or any other element for sensing the presence or movement of a user may be present. Such sensing elements may include multiple different elements working together, working in sequence, or both. For example, sensing elements include elements that provide initial sensing, such as light or sound projection, followed by sensing for gesture detection by, for example, an ultrasonic time of flight camera or a patterned light camera.

Also in some embodiments, the system includes a light generator to produce an illuminated line. In some embodiments, this line provides a visual cue regarding a virtual boundary, namely an imaginary or virtual location in space, where action of the user to pass or break through the virtual boundary or plane is interpreted as an intent to engage with the computing system. In some embodiments, the illuminated line may change colors as the computing system transitions into different states with regard to the user. The illuminated line may be used to provide a visual cue for the user of a virtual boundary in space, and may be used by the system to determine transitions in state of the computer with regard to the user, including determining when the user wishes to engage with the computer.

In some embodiments, the computer senses user position and operates to interpret the movement of a hand of the user through the virtual boundary as a gesture indicating an intention of the user to engage with the computer. In some embodiments, upon the user passing through the virtual line or plane the light generated by the light generator may change, thereby providing visual feedback to the user that the user has entered an area for providing gestures to provide input to the computer.

Display screens may provide visual indications of transitions of state of the computing system with regard to a user. In some embodiments, a first screen is provided in a first state in which the presence of a user is sensed by the system, such as through use of one or more of the sensing elements.

In some implementations, the system acts to sense user identity, such as by facial recognition. Here, transition to a second screen may be provided in a second state, in which the computing system has recognized the user identity, where this second the screen provides visual feedback to the user that the user has transitioned into a new state. Transition to a third screen may occur in a third state in which the user has confirmed recognition of the user.

In some embodiments, the computing system may use a transition mechanism to determine a location of a virtual boundary for a user, where the location of the virtual boundary may vary with user and context. The computing system may generate a light, such as an illuminated line, to indicate the virtual boundary for engaging with the system. In some embodiments, the computing system may be in a waiting state, and the light may be produced in a first color. The computing system may detect whether the user has reached past the virtual boundary, such as by sensing the presence and movement of the user using sensing elements.

In some embodiments, if the user has been detected as having crossed the virtual boundary (such as the hands of the user being closer to the computing system than the virtual boundary line), the computing system may transition to a state for receiving gesture inputs from the user, where a mechanism to indicate the transition may include the light indicating the virtual boundary changing to a second color.

In some embodiments, the computing system may then determine whether gesture movement is detected. If gesture movement is detected, the computing system may proceed with a gesture recognition process, which may include the use of data from a gesture data library, which may reside in memory in the computing device or may be otherwise accessed by the computing device.

If a gesture of the user is recognized, the computing system may perform a function in response to the input, and return to receive additional gestures if the user is within the virtual boundary. In some embodiments, if the gesture is not recognized, the computing system may transition into an error state, where a mechanism to indicate the error state may include the light indicating the virtual boundary changing to a third color, with the system returning to receive additional gestures if the user is within the virtual boundary for engaging with the computing system.

As mentioned above, in other embodiments the system can be configured as a convertible tablet system that can be used in at least two different modes, a tablet mode and a notebook mode. The convertible system may have two panels, namely a display panel and a base panel such that in the tablet mode the two panels are disposed in a stack on top of one another. In the tablet mode, the display panel faces outwardly and may provide touch screen functionality as found in conventional tablets. In the notebook mode, the two panels may be arranged in an open clamshell configuration.

In various embodiments, the accelerometer may be a 3-axis accelerometer having data rates of at least 50 Hz. A gyroscope may also be included, which can be a 3-axis gyroscope. In addition, an e-compass/magnetometer may be present. Also, one or more proximity sensors may be provided (e.g., for lid open to sense when a person is in proximity (or not) to the system and adjust power/performance to extend battery life). For some OS's Sensor Fusion capability including the accelerometer, gyroscope, and compass may provide enhanced features. In addition, via a sensor hub having a real-time clock (RTC), a wake from sensors mechanism may be realized to receive sensor input when a remainder of the system is in a low power state.

In some embodiments, an internal lid/display open switch or sensor to indicate when the lid is closed/open, and can be used to place the system into Connected Standby or automatically wake from Connected Standby state. Other system sensors can include ACPI sensors for internal processor, memory, and skin temperature monitoring to enable changes to processor and system operating states based on sensed parameters.

In an embodiment, the OS may be a Microsoft® Windows® 8 OS that implements Connected Standby (also referred to herein as Win8 CS). Windows 8 Connected Standby or another OS having a similar state can provide, via a platform as described herein, very low ultra-idle power to enable applications to remain connected, e.g., to a cloud-based location, at very low power consumption. The platform can supports 3 power states, namely screen on (normal); Connected Standby (as a default "off" state); and shutdown (zero watts of power consumption). Thus in the Connected Standby state, the platform is logically on (at minimal power levels) even though the screen is off. In such a platform, power management can be made to be transparent to applications and maintain constant connectivity, in part due to offload technology to enable the lowest powered component to perform an operation.

Also seen in FIG. 8, various peripheral devices may couple to processor 810 via a low pin count (LPC) interconnect. In the embodiment shown, various components can be coupled through an embedded controller (EC) 835. Such components can include a keyboard 836 (e.g., coupled via a PS2 interface), a fan 837, and a thermal sensor 839. In some embodiments, touch pad 830 may also couple to EC 835 via a PS2 interface. In addition, a security processor such as a trusted platform module (TPM) 838 in accordance with the Trusted Computing Group (TCG) TPM Specification Version 1.2, dated Oct. 2, 2003, may also couple to processor 810 via this LPC interconnect. However, understand the scope of the present disclosure is not limited in this regard and secure processing and storage of secure information may be in another protected location such as a static random access memory (SRAM) in a security coprocessor, or as encrypted data blobs that are only decrypted when protected by a secure enclave (SE) processor mode.

In a particular implementation, peripheral ports may include a high definition media interface (HDMI) connector (which can be of different form factors such as full size, mini or micro); one or more USB ports, such as full-size external ports in accordance with a Universal Serial Bus specification, with at least one powered for charging of USB devices (such as smartphones) when the system is in Connected Standby state and is plugged into AC wall power. In addition, one or more Thunderbolt™ ports can be provided. Other ports may include an externally accessible card reader such as a full size SD-XC card reader and/or a SIM card reader for WWAN (e.g., an 8 pin card reader). For audio, a 3.5 mm jack with stereo sound and microphone capability (e.g., combination functionality) can be present, with support for jack detection (e.g., headphone only support using microphone in the lid or headphone with microphone in cable). In some embodiments, this jack can be re-taskable between stereo headphone and stereo microphone input. Also, a power jack can be provided for coupling to an AC brick.

System 800 can communicate with external devices in a variety of manners, including wirelessly. In the embodiment shown in FIG. 8, various wireless modules, each of which can correspond to a radio configured for a particular wireless communication protocol, are present. One manner for wireless communication in a short range such as a near field may be via a near field communication (NFC) unit 845 which may communicate, in one embodiment with processor 810 via an SMBus. Note that via this NFC unit 845, devices in close proximity to each other can communicate. For example, a user can enable system 800 to communicate with another (e.g.) portable device such as a smartphone of the user via adapting the two devices together in close relation and enabling transfer of information such as identification information payment information, data such as image data or so forth. Wireless power transfer may also be performed using a NFC system.

Using the NFC unit described herein, users can bump devices side-to-side and place devices side-by-side for near field coupling functions (such as near field communication and wireless power transfer (WPT)) by leveraging the coupling between coils of one or more of such devices. More specifically, embodiments provide devices with strategically shaped, and placed, ferrite materials, to provide for better coupling of the coils. Each coil has an inductance associated with it, which can be chosen in conjunction with the resistive, capacitive, and other features of the system to enable a common resonant frequency for the system.

As further seen in FIG. 8, additional wireless units can include other short range wireless engines including a WLAN unit 850 and a Bluetooth unit 852. Using WLAN unit 850, Wi-Fi™ communications in accordance with a given Institute of Electrical and Electronics Engineers (IEEE) 802.11 standard can be realized, while via Bluetooth unit 852, short range communications via a Bluetooth protocol can occur. These units may communicate with processor 810 via, e.g., a USB link or a universal asynchronous receiver transmitter (UART) link. Or these units may couple to processor 810 via an interconnect according to a Peripheral Component Interconnect Express™ (PCIe™) protocol, e.g., in accordance with the PCI Express™ Specification Base Specification version 3.0 (published Jan. 17, 2007), or another such protocol such as a serial data input/output (SDIO) standard. Of course, the actual physical connection between these peripheral devices, which may be configured on one or more add-in cards, can be by way of the NGFF connectors adapted to a motherboard.

In addition, wireless wide area communications, e.g., according to a cellular or other wireless wide area protocol, can occur via a WWAN unit 856 which in turn may couple to a subscriber identity module (SIM) 857. In addition, to enable receipt and use of location information, a GPS module 855 may also be present. Note that in the embodiment shown in FIG. 8, WWAN unit 856 and an integrated capture device such as a camera module 854 may communicate via a given USB protocol, e.g., USB 2.0 or 3.0 link, or a UART or I$^2$C protocol. Again the actual physical connection of these units can be via adaptation of a NGFF add-in card to an NGFF connector configured on the motherboard.

In a particular embodiment, wireless functionality can be provided modularly, e.g., with a WiFi™ 802.11ac solution (e.g., add-in card that is backward compatible with IEEE 802.11abgn) with support for Windows 8 CS. This card can be configured in an internal slot (e.g., via an NGFF adapter). An additional module may provide for Bluetooth capability (e.g., Bluetooth 4.0 with backwards compatibility) as well as Intel® Wireless Display functionality. In addition NFC support may be provided via a separate device or multifunction device, and can be positioned as an example, in a front right portion of the chassis for easy access. A still additional module may be a WWAN device that can provide support for 3G/4G/LTE and GPS. This module can be implemented in an internal (e.g., NGFF) slot. Integrated antenna support can be provided for WiFi™, Bluetooth, WWAN, NFC and GPS, enabling seamless transition from WiFi™ to WWAN radios, wireless gigabit (WiGig) in accordance with the Wireless Gigabit Specification (July 2010), and vice versa.

As described above, an integrated camera can be incorporated in the lid. As one example, this camera can be a high resolution camera, e.g., having a resolution of at least 2.0 megapixels (MP) and extending to 6.0 MP and beyond.

To provide for audio inputs and outputs, an audio processor can be implemented via a digital signal processor (DSP) 860, which may couple to processor 810 via a high definition audio (HDA) link. Similarly, DSP 860 may communicate with an integrated coder/decoder (CODEC) and amplifier 862 that in turn may couple to output speakers 863 which may be implemented within the chassis. Similarly, amplifier and CODEC 862 can be coupled to receive audio inputs from a microphone 865 which in an embodiment can be implemented via dual array microphones (such as a digital microphone array) to provide for high quality audio inputs to enable voice-activated control of various operations within the system. Note also that audio outputs can be provided from amplifier/CODEC 862 to a headphone jack 864. Although shown with these particular components in the embodiment of FIG. 8, understand the scope of the present disclosure is not limited in this regard.

In a particular embodiment, the digital audio codec and amplifier are capable of driving the stereo headphone jack, stereo microphone jack, an internal microphone array and stereo speakers. In different implementations, the codec can be integrated into an audio DSP or coupled via an HD audio path to a peripheral controller hub (PCH). In some implementations, in addition to integrated stereo speakers, one or more bass speakers can be provided, and the speaker solution can support DTS audio.

In some embodiments, processor 810 may be powered by an external voltage regulator (VR) and multiple internal voltage regulators that are integrated inside the processor die, referred to as fully integrated voltage regulators (FIVRs). The use of multiple FIVRs in the processor enables the grouping of components into separate power planes, such that power is regulated and supplied by the FIVR to only those components in the group. During power management, a given power plane of one FIVR may be powered down or off when the processor is placed into a certain low power state, while another power plane of another FIVR remains active, or fully powered.

In one embodiment, a sustain power plane can be used during some deep sleep states to power on the I/O pins for several I/O signals, such as the interface between the processor and a PCH, the interface with the external VR and the interface with EC 835. This sustain power plane also powers an on-die voltage regulator that supports the on-board SRAM or other cache memory in which the processor context is stored during the sleep state. The sustain power plane is also used to power on the processor's wakeup logic that monitors and processes the various wakeup source signals.

During power management, while other power planes are powered down or off when the processor enters certain deep sleep states, the sustain power plane remains powered on to support the above-referenced components. However, this can lead to unnecessary power consumption or dissipation when those components are not needed. To this end, embodiments may provide a connected standby sleep state to maintain processor context using a dedicated power plane. In one embodiment, the connected standby sleep state facilitates processor wakeup using resources of a PCH which itself may be present in a package with the processor. In one embodiment, the connected standby sleep state facilitates sustaining processor architectural functions in the PCH until processor wakeup, this enabling turning off all of the unnecessary processor components that were previously left powered on during deep sleep states, including turning off all of the clocks. In one embodiment, the PCH contains a time stamp counter (TSC) and connected standby logic for controlling the system during the connected standby state. The integrated voltage regulator for the sustain power plane may reside on the PCH as well.

In an embodiment, during the connected standby state, an integrated voltage regulator may function as a dedicated power plane that remains powered on to support the dedicated cache memory in which the processor context is stored such as critical state variables when the processor enters the deep sleep states and connected standby state. This critical state may include state variables associated with the architectural, micro-architectural, debug state, and/or similar state variables associated with the processor.

The wakeup source signals from EC 835 may be sent to the PCH instead of the processor during the connected standby state so that the PCH can manage the wakeup processing instead of the processor. In addition, the TSC is maintained in the PCH to facilitate sustaining processor architectural functions. Although shown with these particular components in the embodiment of FIG. 8, understand the scope of the present disclosure is not limited in this regard.

Power control in the processor can lead to enhanced power savings. For example, power can be dynamically allocate between cores, individual cores can change frequency/voltage, and multiple deep low power states can be provided to enable very low power consumption. In addition, dynamic control of the cores or independent core portions can provide for reduced power consumption by powering off components when they are not being used.

Some implementations may provide a specific power management IC (PMIC) to control platform power. Using this solution, a system may see very low (e.g., less than 5%) battery degradation over an extended duration (e.g., 16 hours) when in a given standby state, such as when in a Win8 Connected Standby state. In a Win8 idle state a battery life exceeding, e.g., 9 hours may be realized (e.g., at 150 nits). As to video playback, a long battery life can be realized, e.g., full HD video playback can occur for a minimum of 6 hours. A platform in one implementation may have an energy capacity of, e.g., 35 watt hours (Whr) for a Win8 CS using an SSD and (e.g.) 40-44Whr for Win8 CS using an HDD with a RST cache configuration.

A particular implementation may provide support for 15W nominal CPU thermal design power (TDP), with a configurable CPU TDP of up to approximately 25W TDP design point. The platform may include minimal vents owing to the thermal features described above. In addition, the platform is pillow-friendly (in that no hot air is blowing at the user). Different maximum temperature points can be realized depending on the chassis material. In one implementation of a plastic chassis (at least having to lid or base portion of plastic), the maximum operating temperature can be 52 degrees Celsius (C). And for an implementation of a metal chassis, the maximum operating temperature can be 46° C.

In different implementations, a security module such as a TPM can be integrated into a processor or can be a discrete device such as a TPM 2.0 device. With an integrated security module, also referred to as Platform Trust Technology (PTT), BIOS/firmware can be enabled to expose certain hardware features for certain security features, including secure instructions, secure boot, Intel® Anti-Theft Technology, Intel® Identity Protection Technology, Intel® Trusted Execution Technology (TXT), and Intel® Manageability Engine Technology along with secure user interfaces such as a secure keyboard and display.

System 800 of FIG. 8 may include one or more eSPI busses and an eSPI port expander according to an embodiment of the invention, instead of or in addition to either or both of the SPI and/or LPC interconnects shown in FIG. 8.

Figure 9:
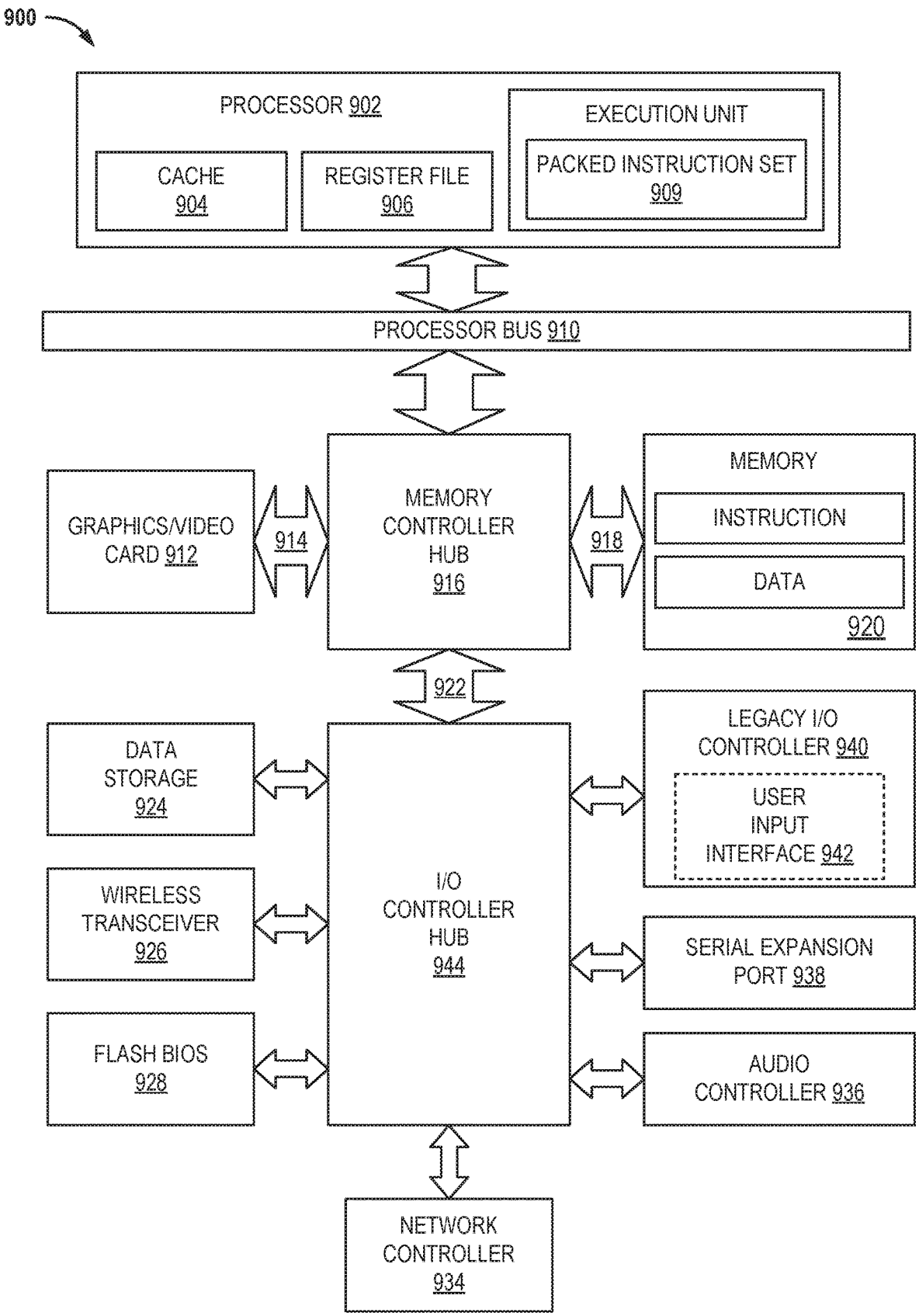
FIG. 9 illustrates another computing system according to an embodiment.

Turning to FIG. 9, a block diagram of an exemplary computer system formed with a processor that includes execution units to execute an instruction, where one or more of the components and/or interconnects implements one or more features (including an eSPI port expander) in accordance with embodiments is illustrated. System 900 includes a component (which may correspond to host device 102 in FIG. 1), such as a processor 902 to employ execution units including logic to perform algorithms for process data, in accordance with the present disclosure, such as in the embodiment described herein. System 900 is representative of processing systems based on the PENTIUM III™, PENTIUM 4™ Xeon™, Itanium, XScale™ and/or StrongARM™ microprocessors available from Intel Corporation of Santa Clara, Calif., although other systems (including PCs having other microprocessors, engineering workstations, set-top boxes and the like) may also be used. In one embodiment, sample system 900 executes a version of the WINDOWS™ operating system available from Microsoft Corporation of Redmond, Wash., although other operating systems (UNIX and Linux for example), embedded software, and/or graphical user interfaces, may also be used. Thus, embodiments of the present disclosure are not limited to any specific combination of hardware circuitry and software.

Embodiments are not limited to computer systems. Alternative embodiments of the present disclosure can be used in other devices such as handheld devices and embedded applications. Some examples of handheld devices include cellular phones, Internet Protocol devices, digital cameras, personal digital assistants (PDAs), and handheld PCs. Embedded applications can include a micro controller, a digital signal processor (DSP), system on a chip, network computers (NetPC), set-top boxes, network hubs, wide area network (WAN) switches, or any other system that can perform one or more instructions in accordance with at least one embodiment.

In this illustrated embodiment, processor 902 includes one or more execution units 908 to implement an algorithm that is to perform at least one instruction. One embodiment may be described in the context of a single processor desktop or server system, but alternative embodiments may be included in a multiprocessor system. System 900 is an example of a 'hub' system architecture. The computer system 900 includes a processor 902 to process data signals. The processor 902, as one illustrative example, includes a complex instruction set computer (CISC) microprocessor, a reduced instruction set computing (RISC) microprocessor, a very long instruction word (VLIW) microprocessor, a processor implementing a combination of instruction sets, or any other processor device, such as a digital signal processor, for example. The processor 902 is coupled to a processor bus 910 that transmits data signals between the processor 902 and other components in the system 900. The elements of system 900 (e.g. graphics accelerator 912, memory controller hub 916, memory 920, I/O controller hub 944 (which may include or have connected to it an eSPI port expander according to an embodiment of the invention), wireless transceiver 926, Flash BIOS 928, Network controller 934, Audio controller 936, Serial expansion port 938, I/O controller 940, etc.) perform their conventional functions that are well known to those familiar with the art.

In one embodiment, the processor 902 includes a Level 1 (L1) internal cache memory 904. Depending on the architecture, the processor 902 may have a single internal cache or multiple levels of internal caches. Other embodiments include a combination of both internal and external caches depending on the particular implementation and needs. Register file 906 is to store different types of data in various registers including integer registers, floating point registers, vector registers, banked registers, shadow registers, checkpoint registers, status registers, and instruction pointer register.

Execution unit 908, including logic to perform integer and floating-point operations, also resides in the processor 902. The processor 902, in one embodiment, includes a microcode (μcode) ROM to store microcode, which when executed, is to perform algorithms for certain macroinstructions or handle complex scenarios. Here, microcode is potentially updateable to handle logic bugs/fixes for processor 902. For one embodiment, execution unit 908 includes logic to handle a packed instruction set 909. By including the packed instruction set 909 in the instruction set of a general-purpose processor 902, along with associated circuitry to execute the instructions, the operations used by many multimedia applications may be performed using packed data in a general-purpose processor 902. Thus, many multimedia applications are accelerated and executed more efficiently by using the full width of a processor's data bus for performing operations on packed data. This potentially eliminates the need to transfer smaller units of data across the processor's data bus to perform one or more operations, one data element at a time.

Alternate embodiments of an execution unit 908 may also be used in micro controllers, embedded processors, graphics devices, DSPs, and other types of logic circuits. System 900 includes a memory 920. Memory 920 includes a dynamic random-access memory (DRAM) device, a static random-access memory (SRAM) device, flash memory device, or other memory device. Memory 920 stores instructions and/or data represented by data signals that are to be executed by the processor 902.

Note that any of the aforementioned features or aspects of the embodiments of the disclosure may be utilized on one or more interconnect illustrated in FIG. 9. For example, an on-die interconnect (ODI), which is not shown, for coupling internal units of processor 902 implements one or more aspects of the disclosure herein. Or the embodiments of the disclosure are associated with a processor bus 910 (e.g. Intel Quick Path Interconnect (QPI) or other known high performance computing interconnect), a high bandwidth memory path 918 to memory 920, a point-to-point link 914 to graphics accelerator 912 (e.g. a Peripheral Component Interconnect express (PCIe) compliant fabric), a controller hub interconnect 922, an I/O or other interconnect (e.g. USB, PCI, PCIe) for coupling the other illustrated components. Some examples of such components include the audio controller 936, firmware hub (flash BIOS) 928, wireless transceiver 926, data storage 924, legacy I/O controller 910 containing user input and keyboard interfaces 942, a serial expansion port 938 such as Universal Serial Bus (USB), and a network controller 934. The data storage device 924 can comprise a hard disk drive, a floppy disk drive, a CD-ROM device, a flash memory device, or other mass storage device.

Figure 10:
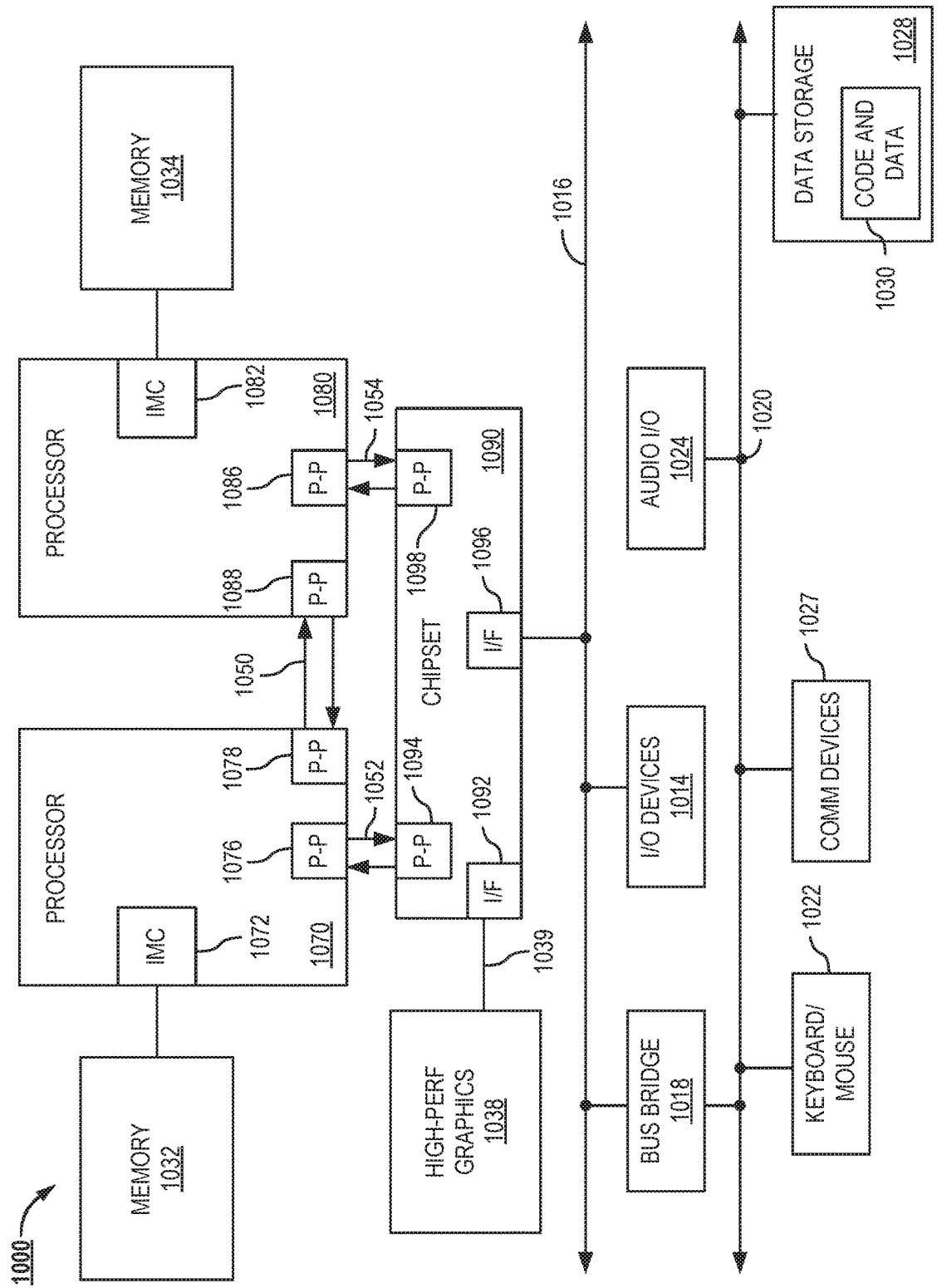
FIG. 10 illustrates another computing system according to an embodiment.

Referring now to FIG. 10, shown is a block diagram of a second system 1000 that may include an eSPI port expander accordance with an embodiment. As shown in FIG. 10, multiprocessor system 1000 is a point-to-point interconnect system, and includes a first processor 1070 and a second processor 1080 coupled via a point-to-point interconnect 1050. Each of processors 1070 and 1080 may be some version of a processor. In one embodiment, 1052 and 1054 are part of a serial, point-to-point coherent interconnect fabric, such as Intel's Quick Path Interconnect (QPI) architecture. As a result, embodiments of the disclosure may be implemented within the QPI architecture.

While shown with only two processors 1070, 1080, it is to be understood that the scope of the present disclosure is not so limited. In other embodiments, one or more additional processors may be present in a given processor.

Processors 1070 and 1080 are shown including integrated memory controller units 1072 and 1082, respectively. Processor 1070 also includes as part of its bus controller units point-to-point (P-P) interfaces 1076 and 1078; similarly, second processor 1080 includes P-P interfaces 1086 and 1088. Processors 1070, 1080 may exchange information via a point-to-point (P-P) interface 1050 using P-P interface circuits 1078, 1088. As shown in FIG. 10, IMCs 1072 and 1082 couple the processors to respective memories, namely a memory 1032 and a memory 1034, which may be portions of main memory locally attached to the respective processors.

Processors 1070, 1080 each exchange information with a chipset 1090 via individual P-P interfaces 1052, 1054 using point to point interface circuits 1076, 1094, 1086, 1098.

Chipset 1090 also exchanges information with a high-performance graphics circuit 1038 via an interface circuit 1092 along a high-performance graphics interconnect 1039.

A shared cache (not shown) may be included in either processor or outside of both processors; yet connected with the processors via P-P interconnect, such that either or both processors' local cache information may be stored in the shared cache if a processor is placed into a low power mode.

Chipset 1090 may be coupled to a first bus 1016 via an interface 1096. In one embodiment, first bus 1016 may be a Peripheral Component Interconnect (PCI) bus, or a bus such as a PCI Express bus or another third generation I/O interconnect bus, although the scope of the present disclosure is not so limited. Chipset 1090 may include and/or have coupled to it (directly or indirectly) one or both of a host device and/or an eSPI port expander according to embodiments.

As shown in FIG. 10, various I/O devices 1014 are coupled to first bus 1016, along with a bus bridge 1018 which couples first bus 1016 to a second bus 1020. In one embodiment, second bus 1020 includes a low pin count (LPC) bus. Various devices are coupled to second bus 1020 including, for example, a keyboard and/or mouse 1022, communication devices 1027 and a storage unit 1028 such as a disk drive or other mass storage device which often includes instructions/code and data 1030, in one embodiment. Further, an audio I/O 1024 is shown coupled to second bus 1020. Note that other architectures are possible, where the included components and interconnect architectures vary. For example, instead of the point-to-point architecture of FIG. 10, a system may implement a multi-drop bus or other such architecture.

Embodiments (e.g., of the mechanisms) disclosed herein may be implemented in hardware (e.g., a computer programmed to perform a method may be as described in the detailed description), software, firmware, or a combination of such implementation approaches. Embodiments of the disclosure may be implemented as computer programs or program code executing on programmable systems comprising at least one processor, a storage system (including volatile and non-volatile memory and/or storage elements), at least one input device, and at least one output device.

Program code may be executed to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. The mechanisms described herein are not limited in scope to any particular programming language. The language may be a compiled or interpreted language.

One or more aspects of at least one embodiment may be implemented by representative instructions stored on a non-transitory, machine-readable medium which represents various logic within the processor, which when read by a machine causes the machine to fabricate logic to perform the techniques described herein. Such representations, which may be generally referred to as "IP cores" may be stored on a tangible, machine readable medium and supplied to various customers or manufacturing facilities to load into the fabrication machines that make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the disclosure also include non-transitory, tangible machine-readable media containing instructions or containing design data, such as Hardware Description Language (HDL), which defines structures, circuits, apparatuses, processors and/or system features described herein. Such embodiments may also be referred to as program products.

What is claimed is:

1. An apparatus comprising:
   an upstream enhanced serial peripheral interface (eSPI) port to be coupled through an upstream eSPI bus to a host eSPI master port in a host device and to operate as an eSPI slave on the upstream eSPI bus;
   a plurality of downstream eSPI ports, each to operate as an eSPI master on a corresponding one of a plurality of downstream eSPI buses; and
   an eSPI aggregator to forward or broadcast transactions from the upstream eSPI bus to one or more of the plurality of downstream eSPI buses, to aggregate responses from one or more of the downstream eSPI buses, and to determine an OR'd result of eSPI channel-level capabilities of a plurality of eSPI slaves connected to the plurality of downstream eSPI buses.

2. The apparatus of claim 1, wherein the eSPI aggregator is also to determine a least common eSPI bus-level capability of a plurality of eSPI slaves connected to the plurality of downstream eSPI buses.

3. The apparatus of claim 2, wherein the eSPI aggregator is also to present the least common eSPI bus-level capability of the plurality of eSPI slaves as its bus-level capability on the upstream eSPI bus.

4. The apparatus of claim 2, wherein the least common eSPI bus-level capability is one of an input/output, a frequency, a cyclic redundancy check, and a wait capability.

5. The apparatus of claim 1, wherein the eSPI aggregator is also to present the OR'd result of eSPI channel-level capabilities of the plurality of eSPI slaves as its channel-level capabilities on the upstream eSPI bus.

6. The apparatus of claim 1, wherein the eSPI aggregator is also to aggregate a plurality of statuses into an aggregate status to present to the upstream eSPI bus, each of the plurality of statuses corresponding to one of a plurality of eSPI slaves connected to the plurality of downstream eSPI buses.

7. The apparatus of claim 6, wherein the aggregate status is to indicate whether the apparatus is free.

8. The apparatus of claim 7, wherein the aggregate status is presented as free if a corresponding status of all the plurality of eSPI slaves is free.

9. The apparatus of claim 6, wherein the aggregate status is to indicate whether the apparatus is available.

10. The apparatus of claim 9, wherein the aggregate status is presented as free if a corresponding status of any of the plurality of eSPI slaves is available.

11. The apparatus of claim 6, wherein the aggregate status is to indicate whether a channel is ready.

12. The apparatus of claim 11, wherein the aggregate status is presented as ready if a corresponding status of all the plurality of eSPI slaves is ready.

13. The apparatus of claim 1, further comprising eSPI configuration registers to store, as eSPI configuration information of the apparatus, aggregated eSPI configuration information of a plurality of eSPI slaves connected to the plurality of downstream eSPI buses.

14. A method comprising:
issuing, by an enhanced serial peripheral interconnect (eSPI) port expander, a plurality of commands on a plurality of downstream eSPI buses to discover the capabilities of a plurality of eSPI slave devices connected to the plurality of downstream eSPI buses;
aggregating, by the eSPI port expander, the capabilities of the plurality of eSPI slave devices into an aggregated capability of the eSPI port expander; and
presenting, by the eSPI port expander, the aggregated capability of the eSPI port expander on an upstream eSPI bus to a host eSPI master port in a host device, wherein the aggregated capability is an OR'd result of channel level capabilities of the plurality of eSPI slave devices.

15. The method of claim 14, wherein the aggregated capability is a least common bus-level capability of the plurality of eSPI slave devices.

16. A system comprising:
an upstream enhanced serial peripheral interface (eSPI) bus;
a host device to operate as a master on the upstream eSPI bus;
a plurality of downstream eSPI buses;
a plurality of eSPI slave devices, each connected to a corresponding one of the plurality of downstream eSPI buses; and
an eSPI port expander comprising:
an upstream eSPI port to operate as an eSPI slave on the upstream eSPI bus;
a plurality of downstream eSPI ports, each to operate as an eSPI master on a corresponding one of the plurality of downstream eSPI buses; and
an eSPI aggregator to forward or broadcast transactions from the upstream eSPI bus to one or more of the plurality of downstream eSPI buses, to aggregate responses from one or more of the downstream eSPI buses, determine an OR'd result of eSPI channel-level capabilities of a plurality of eSPI slaves connected to the plurality of downstream eSPI buses, and present the OR'd result of eSPI channel-level capabilities of the plurality of eSPI slaves as its channel-level capabilities on the upstream eSPI bus.

17. The apparatus of claim 16, wherein the eSPI aggregator is also to:
determine a least common eSPI bus-level capability of a plurality of eSPI slaves connected to the plurality of downstream eSPI buses; and
present the least common eSPI bus-level capability of the plurality of eSPI slaves as its bus-level capability on the upstream eSPI bus.

* * * * *